(12) United States Patent
Ochiai et al.

(10) Patent No.: US 7,218,605 B2
(45) Date of Patent: May 15, 2007

(54) TEMPORARY HALTING METHOD IN ROUTER AND NETWORK

(75) Inventors: Hironori Ochiai, Fukuoka (JP); Akinori Kubota, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 963 days.

(21) Appl. No.: 09/988,965

(22) Filed: Nov. 19, 2001

(65) Prior Publication Data

US 2003/0007451 A1  Jan. 9, 2003

(30) Foreign Application Priority Data

Jul. 4, 2001  (JP)  ............................. 2001-204000

(51) Int. Cl.
*G01R 31/08* (2006.01)

(52) U.S. Cl. ........................ 370/216; 370/217; 370/221; 370/400; 714/1; 714/100

(58) Field of Classification Search ........ 370/216–221; 714/100, 1–4

See application file for complete search history.

(56) References Cited

U.S. PATENT DOCUMENTS

| | | | | |
|---|---|---|---|---|
| 5,535,389 A | * | 7/1996 | Elder et al. .................. | 717/170 |
| 5,710,549 A | * | 1/1998 | Horst et al. .............. | 340/825.5 |
| 5,940,813 A | * | 8/1999 | Hutchings .................... | 705/43 |
| 6,049,524 A | * | 4/2000 | Fukushima et al. ......... | 370/220 |
| 6,076,115 A | * | 6/2000 | Sambamurthy et al. ..... | 709/250 |
| 6,085,246 A | * | 7/2000 | Brandt et al. ................ | 709/227 |
| 6,148,411 A | * | 11/2000 | Ichinohe et al. ............... | 714/4 |
| 6,198,722 B1 | * | 3/2001 | Bunch ......................... | 370/229 |
| 6,370,653 B1 | * | 4/2002 | Ichinohe et al. ............... | 714/4 |
| 6,577,634 B1 | * | 6/2003 | Tsukakoshi et al. ... | 370/395.31 |
| 6,704,280 B1 | * | 3/2004 | Mangin et al. ............. | 370/230 |
| 6,912,603 B2 | * | 6/2005 | Kanazashi ................... | 710/29 |

FOREIGN PATENT DOCUMENTS

| | | |
|---|---|---|
| JP | 06-334735 | 12/1994 |
| JP | 10-032234 | 2/1998 |
| JP | 2000-307605 | 11/2000 |

* cited by examiner

*Primary Examiner*—Wing Chan
*Assistant Examiner*—Andrew C. Lee
(74) *Attorney, Agent, or Firm*—Katten Muchin Rosenman LLP

(57) ABSTRACT

A router for routing a frame includes a temporary-halt-start-informing unit for transmitting a temporary-halt-start notification message indicating a start of a temporary halt of the router to adjacent routers in the event of the temporary halt and a temporary-halt-recovery-informing unit for transmitting a temporary-halt-recovery notification message indicating a recovery from a temporary halt of the router to adjacent routers in the event of the recovery from the temporary halt; a temporary-halt-start-notification-receiving unit for receiving a temporary-halt-start notification message indicating a start of a temporary halt of an adjacent router from the adjacent router in the event of the temporary halt.

11 Claims, 18 Drawing Sheets

FIG. 4

| Transmission destination | Transmission source | Status |
|---|---|---|
| ×××× | ×× | Normal/Saved/Locked |
| ×××× | ×× | Normal/Saved/Locked |
| . . . . . | . . . . . | . . . . . |

| Transmission destination | Transmission source | Status |
|---|---|---|
| A | R 7 | Normal |
| B | R 7 | Normal |
| C | R 2 | Normal |
| D | R 2 | Normal |
| E | R 2 | Normal |

| Transmission destination | Transmission source | Status |
|---|---|---|
| A | R 1 | Normal |
| B | R 1 | Normal |
| C | R 3 | Normal |
| D | R 3 | Normal |
| E | R 4 | Normal |

| Transmission destination | Transmission source | Status |
|---|---|---|
| A | R 8 | Normal |
| B | R 8 | Normal |
| C | R 1 | Normal |
| D | R 1 | Normal |
| E | R 1 | Normal |

| Transmission destination | Transmission source | Status |
|---|---|---|
| A | R 7 | Saved |
| B | R 7 | Saved |
| C | R 2 | Saved |
| D | R 2 | Saved |
| E | R 2 | Saved |

| Transmission destination | Transmission source | Status |
|---|---|---|
| A | R 1 | Locked |
| B | R 1 | Locked |
| C | R 3 | Normal |
| D | R 3 | Normal |
| E | R 4 | Normal |

| Transmission destination | Transmission source | Status |
|---|---|---|
| A | R 8 | Normal |
| B | R 8 | Normal |
| C | R 1 | Locked |
| D | R 1 | Locked |
| E | R 1 | Locked |

| Transmission destination | Transmission source | Status |
|---|---|---|
| A | R 7 | Normal |
| B | R 7 | Normal |
| C | R 2 | Normal |
| D | R 2 | Normal |
| E | R 2 | Normal |

| Transmission destination | Transmission source | Status |
|---|---|---|
| A | R 1 | Normal |
| B | R 1 | Normal |
| C | R 3 | Normal |
| D | R 3 | Normal |
| E | R 4 | Normal |

| Transmission destination | Transmission source | Status |
|---|---|---|
| A | R 8 | Normal |
| B | R 8 | Normal |
| C | R 1 | Normal |
| D | R 1 | Normal |
| E | R 1 | Normal |

| Transmission destination | Transmission source | Status |
|---|---|---|
|  |  | Deleted |
|  |  | Deleted |
| C | R 3 | Normal |
| D | R 3 | Normal |
| E | R 4 | Normal |

| Transmission destination | Transmission source | Status |
|---|---|---|
| A | R 8 | Normal |
| B | R 8 | Normal |
|  |  | Deleted |
|  |  | Deleted |
|  |  | Deleted |

TEMPORARY HALTING METHOD IN ROUTER AND NETWORK

BACKGROUND OF THE INVENTION

1. Field of the Invention

The present invention relates to a technique of shortening a recovery time of information on a route after maintenance work or in the event of a temporary failure in a network comprising a plurality of routers.

2. Description of the Related Art

In this specification, a network such as the Internet is a router network comprising a plurality of routers. Each router relays a transmitted frame to an adjacent router in accordance with information on a route in order to pass on the frame to a destination terminal. The frame is originated from a terminal such as a personal computer and transmitted to the destination terminal.

FIG. 17 is a block diagram showing the configuration of the conventional router. A frame-receiving unit 6 outputs route information received from a transmission line by way of an IF unit 2 to a route-information management unit 8. Route information is information on a route including a destination and a distance. Information on a route is transmitted by an adjacent router in accordance with a predetermined protocol such as RIP or OPSF. The route-information management unit 8 stores the information on a route in a route-information database 10. The route-information management unit 8 also passes on the information on a route to an adjacent router by way of the frame-transmitting unit 15 and an IF unit 4. In addition, the route-information management unit 8 determines information on relay routes and stores this information in a relay-route-information database 12. The information on relay routes shows relay routers for destinations of the route information stored in the route-information database 10.

On the other hand, a frame-receiving unit 6 outputs a frame received from the transmission line through the IF unit 2 to a frame-relay-processing unit 14. The frame-relay-processing unit 14 searches the relay-route-information database 12 for a transmission line to the destination of the received frame and passes on the frame to the transmission line relay-route-information database 12.

When detecting an abnormality such as loss of route information supposed to come from an adjacent router or when again receiving information on a route upon recovery of information on a route, the route-information management unit 8 informs an adjacent router of such a change in information on a route.

FIG. 18 is a diagram showing how a change in information on a route flows in the event of a temporary halt. When the operation of a router 16#1 is temporarily halted due to version-upgrading work, for example, a router 16#2 adjacent to the temporarily halted router 16#1 no longer receives information on a route from the temporarily halted router 16#1 on a temporary basis. When detecting the temporarily halted operation of the router 16#1, the adjacent router 16#2 informs further adjacent routers 16#3 and 16#4 of a change in information on a route. When receiving the change in information on a route from the adjacent router 16#2, the further adjacent routers 16#3 and 16#4 report the change in information on a route to still further adjacent routers 16#6 and 16#5 respectively. In this way, the change in information on a route is disseminated throughout the entire network.

In accordance with Japanese Patent Laid-open No. Hei 10-32234, by making OPSF packet headers uniform, information on a route can be exchanged at a high speed. In accordance with Japanese Patent Laid-open No. Hei 6-334735, dissemination of a temporary unstable state of information on a route is suppressed by an apparatus alone by periodically monitoring a change in information on a route and not reporting such a change in the event of such a temporary unstable state such as an intermittent failure. In accordance with Japanese Patent Laid-open No. 2000-307605, a routing table used for transferring an IP packet in the event of a failure is provided separately from a routing table used for transferring an ordinary IP packet in order to increase the speed of a failure recovery.

However, the conventional router raises the following problems. The operation of a router is temporarily halted during maintenance of the router or in the event of a temporary failure occurring in the router. Even for a case in which the original configuration can be restored immediately, a change in information on a route is disseminated throughout the entire network in spite of the fact that routers in the network do not need to know such a change. In this case, the larger the number of routers included in the network, the greater the effect of the problem, or the longer the time it takes to stabilize information on a route. In addition, in accordance with Japanese Patent Laid-open No. Hei 10-32234, information on a route can be exchanged at a high speed. However, there is raised a problem of a long time to stabilize information on a route. Furthermore, in accordance with Japanese Patent Laid-open No. Hei 6-334735, since an apparatus needs to periodically monitor a change in information on a route condition by itself, it is necessary to set the monitoring period in advance at a value including a time required to recover a router from an intermittent failure. Thus, if a timer is set at a short period in spite of the fact that the maintenance time and/or the time required to recover a temporary failure varies, a change in information on a route may be reported immediately even though there is raised a problem that an intermittent failure cannot be handled completely. If the timer is set at a long period, on the contrary, detection of a real failure may be too late, causing another problem that dissemination of a change in information on a route throughout the entire network is also too late. Moreover, a technology disclosed in Japanese Patent Laid-open No. 2000-59426 strives for continuation of communication instead of shortening a time required to stabilize information on a route. Thus, there remains the problem described above that a change in information on a route is disseminated throughout the entire network in spite of the fact that routers in the network do not need to know such a change.

SUMMARY OF THE INVENTION

It is therefore an object of the present invention to provide a router and a network, which are capable of stabilizing route information of routers in the network immediately in a recovery right after maintenance work or a temporary halt accompanying a temporary failure.

In accordance with an aspect of the present invention, there is provided a router for routing a frame, including a first memory, a route-information-receiving unit for receiving route information transmitted by an adjacent router, a route-information-writing unit for storing the information on a route into the first memory, a route-information-transmission control unit for controlling transmission of the information on a route to adjacent routers, a route-information-change-reporting unit for reporting a change in information on a route involving a particular adjacent router to adjacent routers other than the particular adjacent router if information on a route has not been received from the particular adjacent router for at least a predetermined period of time, a relay-processing unit for routing a received frame on the basis of the route information stored in the first memory, a temporary-halt-start-informing unit for transmitting a temporary-halt-start notification message indicating a start of a temporary halt to adjacent routers in the event of the temporary halt and a temporary-halt-recovery-informing unit for transmitting a temporary-halt-recovery notification message indicating a recovery from a temporary halt to adjacent routers in the event of the recovery from the temporary halt.

In accordance with another aspect of the present invention, there is provided a router for routing a frame, including a first memory, a route-information-receiving unit for receiving route information transmitted by an adjacent router, a route-information-writing unit for storing the information on a route into the first memory, route-information-transmission control unit for controlling transmission of the information on a route to adjacent routers, a route-information-change-reporting unit for reporting a change in information on a route involving a particular adjacent router to adjacent routers other than the particular adjacent router if information on a route has not been received from the particular adjacent router for at least a predetermined period of time, a relay-processing unit for routing a received frame on the basis of the route information stored in the first memory, a temporary-halt-start-notification-receiving unit for receiving a temporary-halt-start notification message indicating a start of a temporary halt of an adjacent router from the adjacent router in the event of the temporary halt, a route-information-temporarily-locking unit for requesting the route-information-change-reporting unit to lock an operation to report a change in information on a route involving a particular adjacent router to adjacent routers other than the particular adjacent router when a temporary-halt-start notification message indicating a start of a temporary halt of the particular adjacent router is received from the particular adjacent router, a temporary-halt-recovery-notification-receiving unit for receiving a temporary-halt-recovery notification message indicating a recovery from a temporary halt of an adjacent router from the adjacent router in the event of the recovery from the temporary halt and a route-information-temporary-lock-ending unit for requesting the route-information-change-reporting unit to end a state to temporarily lock an operation to report a change in information on a route involving a particular adjacent router to adjacent routers other than the particular adjacent router when a temporary-halt-recovery notification message indicating a recovery from a temporary halt of the particular adjacent router is received from the particular adjacent router.

In accordance with a further aspect of the present invention, there is provided a temporary halting method adopted in a network including a plurality of routers each used for routing a frame, the temporary halting method including the steps of; having a temporarily halted one of the routers transmit a temporary-halt-start notification message indicating a start of a temporary halt of the temporarily halted router to any one of the routers, which is adjacent to the temporarily halted router, in the event of the temporary halt; having the temporarily halted router transmit a temporary-halt-recovery notification message indicating a recovery from a temporary halt of the temporarily halted router to any one of the routers, which is adjacent to the temporarily halted router, in the event of the recovery from the temporary halt; having any one of the routers, which is adjacent to a temporarily halted one of the routers, lock a state of reporting no change in information on a route involving the temporarily halted router to any adjacent one of the routers, which is other than the temporarily halted router, when receiving a temporary-halt-start notification message indicating a start of a temporary halt from the temporarily halted router even if receiving no information on a route from the temporarily halted router for a predetermined period of time and having any one of the routers, which is adjacent to a temporarily halted one of the routers, resume a monitoring operation of reporting a change in information on a route involving the temporarily halted router to any adjacent one of the routers, which is other than the temporarily halted router, when receiving a temporary-halt-recovery notification message indicating a recovery from a temporary halt from the temporarily halted router or when receiving no information on a route from the temporarily halted router for a predetermined period of time.

In accordance with a still further aspect of the present invention, there is provided a router, including means for reporting a change in information on a route involving a particular adjacent router to adjacent routers other than the particular adjacent router when information on a route has not been received from the particular adjacent router for at least a predetermined period of time, means for transmitting a message to adjacent routers to inform the adjacent routers that the router is temporarily halted when that the router is temporarily halted and means for executing control to report a change in information on a route involving a particular adjacent router to adjacent routers other than the particular adjacent router when the message is received from the particular adjacent router even if information on a route has not been received from the particular adjacent router for at least a predetermined period of time.

The present and other objects, features and advantages of the present invention as well as the manner of realizing them will become more apparent, whereas the invention itself will be best understood from a study of the following description and appended claims with reference to attached drawings showing some preferred embodiments of the invention.

BRIEF DESCRIPTION OF THE DRAWINGS

FIG. 4 is a diagram showing the configuration of a route-information database used in the router shown in FIG. 3;

FIG. 8A is a diagram showing contents of the route-information database in a specific router prior to a temporary halt;

FIG. 8B is a diagram showing contents of the route-information database in a router adjacent to the specific router prior to a temporary halt;

FIG. 8C is a diagram showing contents of the route-information database in another router adjacent to the specific router prior to a temporary halt;

FIG. 9A is a diagram showing contents of the route-information database in a temporarily halted router;

FIG. 9B is a diagram showing contents of the route-information database in a router adjacent to the temporarily halted router;

FIG. 9C is a diagram showing contents of the route-information database in another router adjacent to the temporarily halted router;

FIG. 10A is a diagram showing contents of the route-information database in a temporarily halted router after a recovery from a temporary halt;

FIG. 10B is a diagram showing contents of the route-information database in a router adjacent to the temporarily halted router after the recovery from a temporary halt;

FIG. 10C is a diagram showing contents of the route-information database in another router adjacent to the temporarily halted router after the recovery from a temporary halt;

FIG. 16A is a diagram showing contents of the route-information database in a router after issuance of a locked information elimination notification;

FIG. 16B is a diagram showing contents of the route-information database in a router after issuance of a locked information elimination notification;

DETAILED DESCRIPTION OF THE PREFERRED EMBODIMENTS

Figure 1:
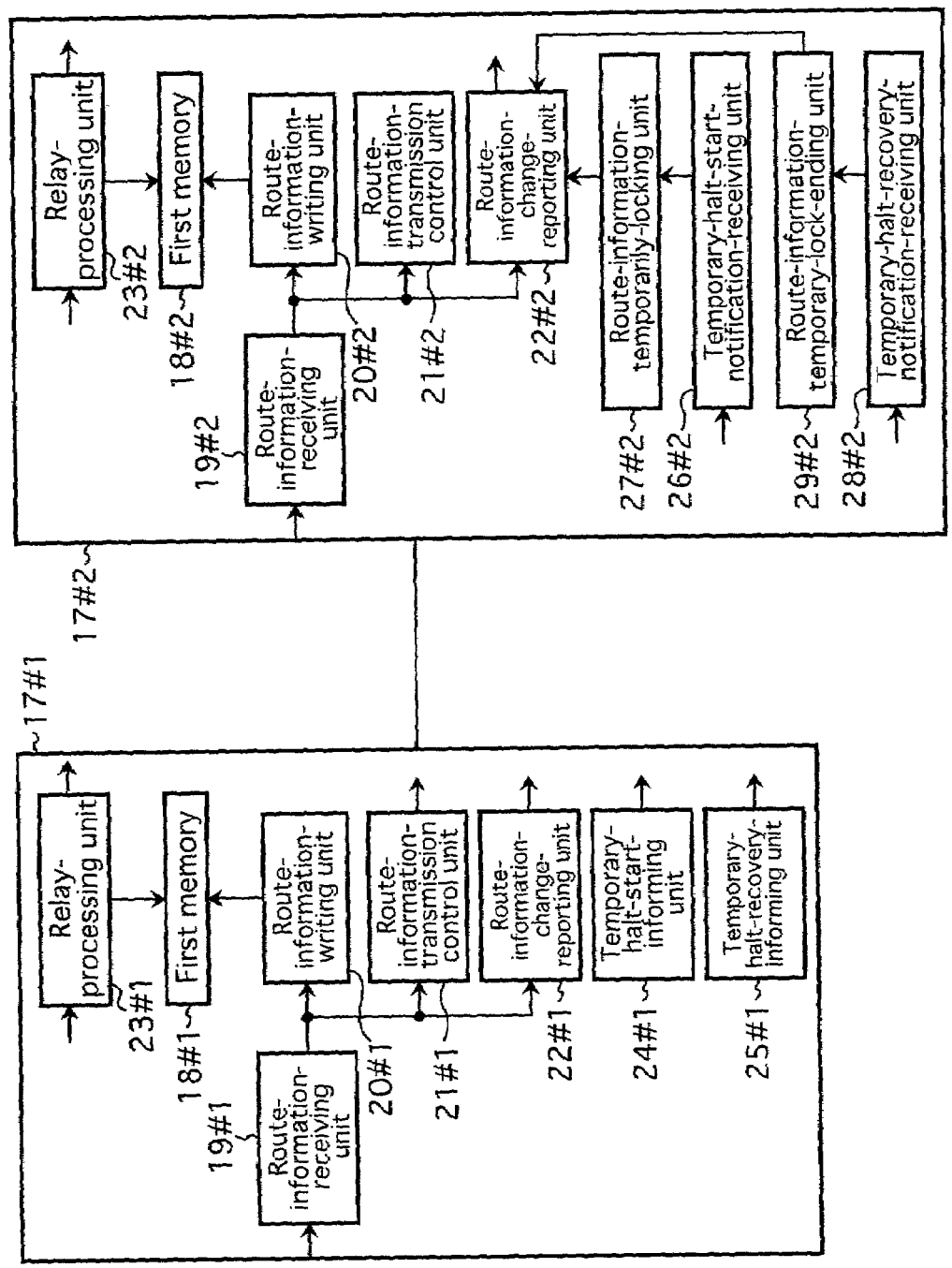
FIG. 1 is a diagram showing the principle of the present invention.

Prior to description of preferred embodiments of the present invention, the principle of the invention is explained. FIG. 1 is a diagram showing the principle of the present invention. As shown in the figure, a network includes a first router 17#1 and a second router 17#2. Let the first router 17#1 be a temporarily halted router and the second router 17#2 be a router adjacent to the first router 17#1.

The first router 17#1 comprises a first memory 18#1, a route-information-receiving unit 19#1, a route-information-writing unit 20#1, a route-information-transmission control unit 21#1, a route-information-change-reporting unit 22#1, a relay-processing unit 23#1, a temporary-halt-start-informing unit 24#1 and a temporary-halt-recovery-informing unit 25#1. On the other hand, the second router 17#2 comprises a first memory 18#2, a route-information-receiving unit 19#2, a route-information-writing unit 20#2, a route-information-transmission control unit 21#2, a route-information-change-reporting unit 22#2, a relay-processing unit 23#2, a temporary-halt-start-notification-receiving unit 26#2, a route-information-temporarily-locking unit 27#2, a temporary-halt-recovery-notification-receiving unit 28#2 and a route-information-temporary-lock-ending unit 29#2.

When the route-information-receiving unit 19#1 receives information on a route while the router 17#1 is operating normally, the route-information-receiving unit 19#1 passes on the information to the route-information-writing unit 20#1, the route-information-transmission control unit 21#1 and the route-information-change-reporting unit 22#1. The route-information-writing unit 20#1 stores the information on a route into the first memory 18#1. The relay-processing unit 23#1 routes a received frame in accordance with route information stored in the first memory 18#1. The route-information-transmission control unit 21#1 controls transmission of information on a route to an adjacent router. When the route-information-receiving unit 19#1 has not received information on a route from a specific adjacent router for at least a predetermined period of time, the route-information-change-reporting unit 22#1 reports a change in information on a route to adjacent routers other than the specific adjacent router.

By the same token, when the route-information-receiving unit 19#2 receives information on a route while the router 17#2 is operating normally, the route-information-receiving unit 19#2 passes on the information to the route-information-writing unit 20#2, the route-information-transmission control unit 21#2 and the route-information-change-reporting unit 22#2. The route-information-writing unit 20#2 stores the information on a route into the first memory 18#2. The relay-processing unit 23#2 routes a received frame in accordance with route information stored in the first memory 18#2. The route-information-transmission control unit 21#2 controls transmission of information on a route to an adjacent router. When the route-information-receiving unit 19#2 has not received information on a route from a specific adjacent router for at least a predetermined period of time, the route-information-change-reporting unit 22#2 informs adjacent routers other than the specific adjacent router of a change in information on a route.

When the router 17#1 is temporarily halted, the temporary-halt-start-informing unit 24#1 transmits a temporary-halt-start notification message indicating a start of a temporary halt to the router 17#2. The temporary-halt-start-notification-receiving unit 26#2 employed in the router 17#2 receives the temporary-halt-start notification message. When the temporary-halt-start-notification-receiving unit 26#2 receives the temporary-halt-start notification message, the route-information-temporarily-locking unit 27#2 requests the route-information-change-reporting unit 22#2 to lock an operation to report a change in information on a route involving the router 17#1 to adjacent routers other than the router 17#1. Requested by the route-information-temporarily-locking unit 27#2, the route-information-change-reporting unit 22#2 locks an operation to report a change in information on a route involving the router 17#1 to adjacent routers other than the router 17#1 even if the route-information-receiving unit 19#2 has not received information on a route from the adjacent router 17#1 for at least a predetermined period of time. In this way, when the router 17#1 is temporarily halted, the router 17#2 will no longer receive information on a route from the router 17#1 and no longer report a change in information on a route involving the router 17#1 to adjacent routers other than the router 17#1. As a result, a change in information on a route involving the router 17#1 is not disseminated to routers throughout the network.

When the router 17#1 is recovered from a temporary halt, the temporary-halt-recovery-informing unit 25#1 transmits a temporary-halt recovery notification message indicating a recovery from the temporary halt to the router 17#2. The temporary-halt-recovery-notification-receiving unit 28#2 employed in the router 17#2 receives the temporary-halt recovery notification message from the router 17#1. When the temporary-halt-recovery-notification-receiving unit 28#2 receives the temporary-halt recovery notification message from the router 17#1, the route-information-temporary-lock-ending unit 29#2 requests the route-information-change-reporting unit 22#2 to end a state to lock an operation to report a change in information on a route involving the router 17#1 to adjacent routers other than the router 17#1. Requested by the route-information-temporary-lock-ending unit 29#2, the route-information-change-reporting unit 22#2 resumes the operation to report a change in information on a route involving the router 17#1 to adjacent routers other than the router 17#1. In this way, when transmission of information on a route from the router 17#1 is interrupted by a temporary halt of the router 17#1, the router 17#2 will no longer report a change in information on a route involving the router 17#1 to adjacent routers other than the router 17#1. Then, as the router 17#1 is recovered from the temporary halt, the router 17#1 and the router 17#2 are capable of routing frames in accordance with information on a route prior to the temporary halt without exchanging any information on a route. As a result, routing of frames can be stabilized in a short period of time.

First Embodiment

Figure 2:
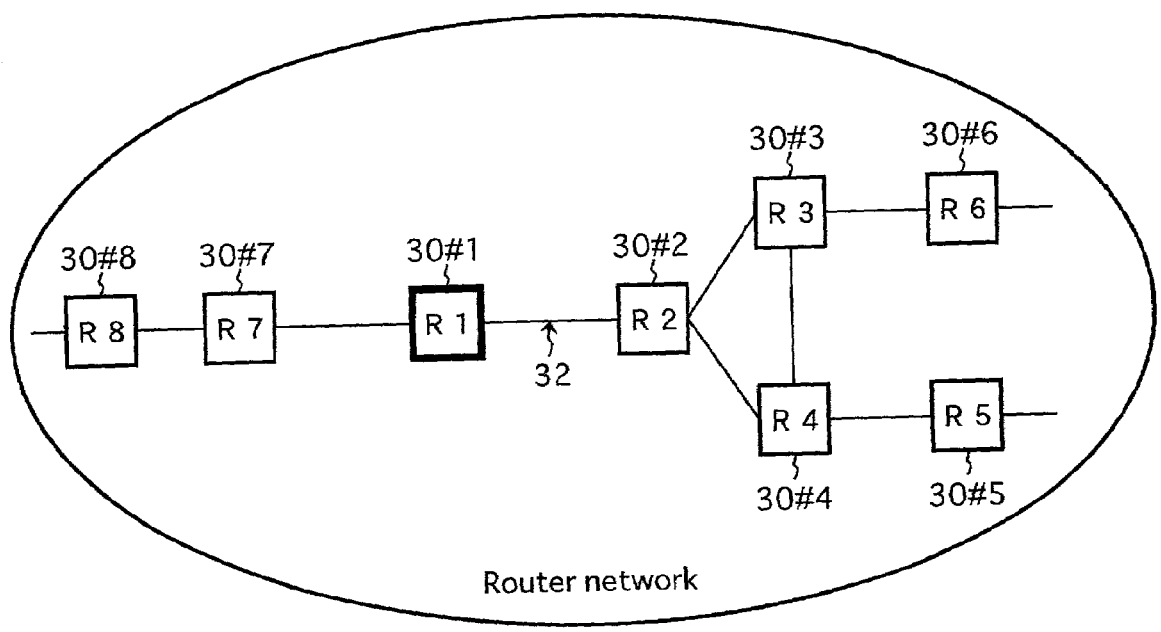
FIG. 2 is a diagram showing the configuration of a router network implemented by a first embodiment of the present invention.

FIG. 2 is a diagram showing the configuration of a router network implemented by a first embodiment of the present invention. As shown in the figure, the router network comprises a plurality of routers 30#i where i=1, 2 and so on, and transmission lines 32. Each of the routers 30#i has the following functions:

1: The router itself is temporarily halted.

1-a: Inform all adjacent routers of a start of a temporary halt. This function is executed to prevent the adjacent routers from reporting a change in information on a route involving this router 30#i to adjacent routers other than this router 30#i. A temporary halt of a router is a state in which the operation of the router is temporarily halted. The operation of a router is temporarily halted typically when software is rebooted, for example, after its version is upgraded. A temporary halt is requested by a person in charge of the router-network management through a console or the like.

1-b: Save route information received from an adjacent router. Such information on a route is normally stored in typically a main memory. It is thus feared that information on a route may be inadvertently erased from the main memory by replacement of software during a temporary halt. By saving the information on a route, the information can be prevented from being inadvertently erased.

1-c: Inform adjacent routers of a recovery from a temporary halt upon the recovery from the temporary halt.

1-d: Restore saved information on a route to an original storage such as the main memory upon a recovery from a temporary halt. In this way, frames can be routed again after the recovery from the temporary halt on the basis of the information on a route prior to the temporary halt without again gathering such information from adjacent routers.

2: An adjacent router is temporarily halted.

2-a: Report no change in information on a route involving the temporarily halted adjacent router to adjacent routers other than the temporarily halted adjacent router in the so-called locked state which begins when a notification of a start of a temporary halt is received from the temporarily halted adjacent router and ends when a notification of a recovery from the temporary halt is received from the temporarily halted adjacent router.

2-b: End the locked state when receiving a notification of a recovery from a temporary halt from the temporarily halted adjacent router.

2-c: Report a change in information on a route involving the temporarily halted adjacent router to adjacent routers other than the temporarily halted router when receiving no information on a route from the temporarily halted router for at least a predetermined period of time.

3: Routing operations are normal.

3-a: Gather information on a route from each adjacent router by adoption of a RIP or OSPF protocol.

3-b: Pass on received information on a route to each adjacent router.

3-c: Create information on an optimum relay route from information on routes.

3-d: Pass on a received frame to an adjacent router corresponding to a destination address included in the received frame by referring to the information on a relay route.

Figure 3:
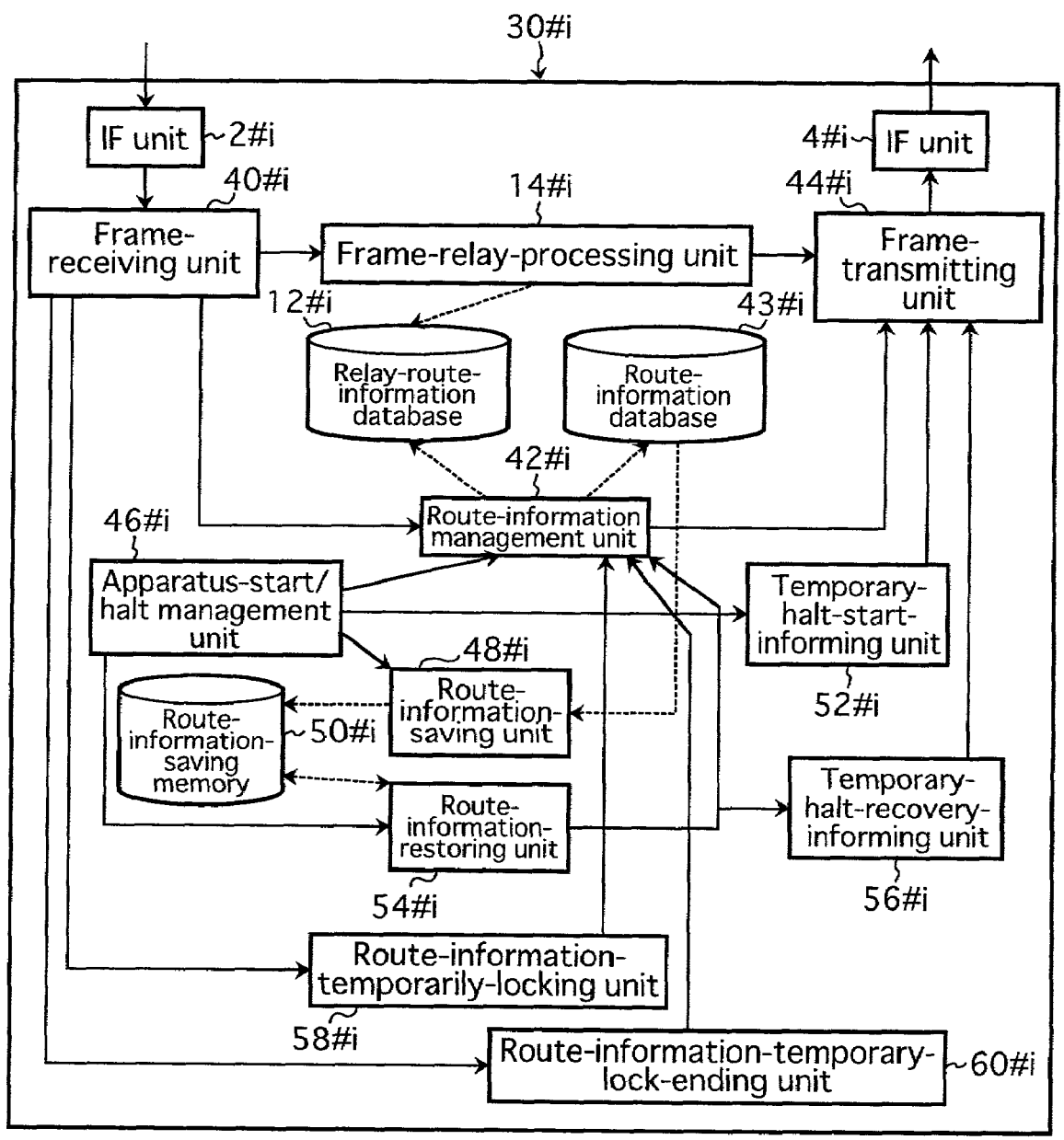
FIG. 3 is a diagram showing the configuration of a router employed in the router network shown in FIG. 2.
Figure 17:
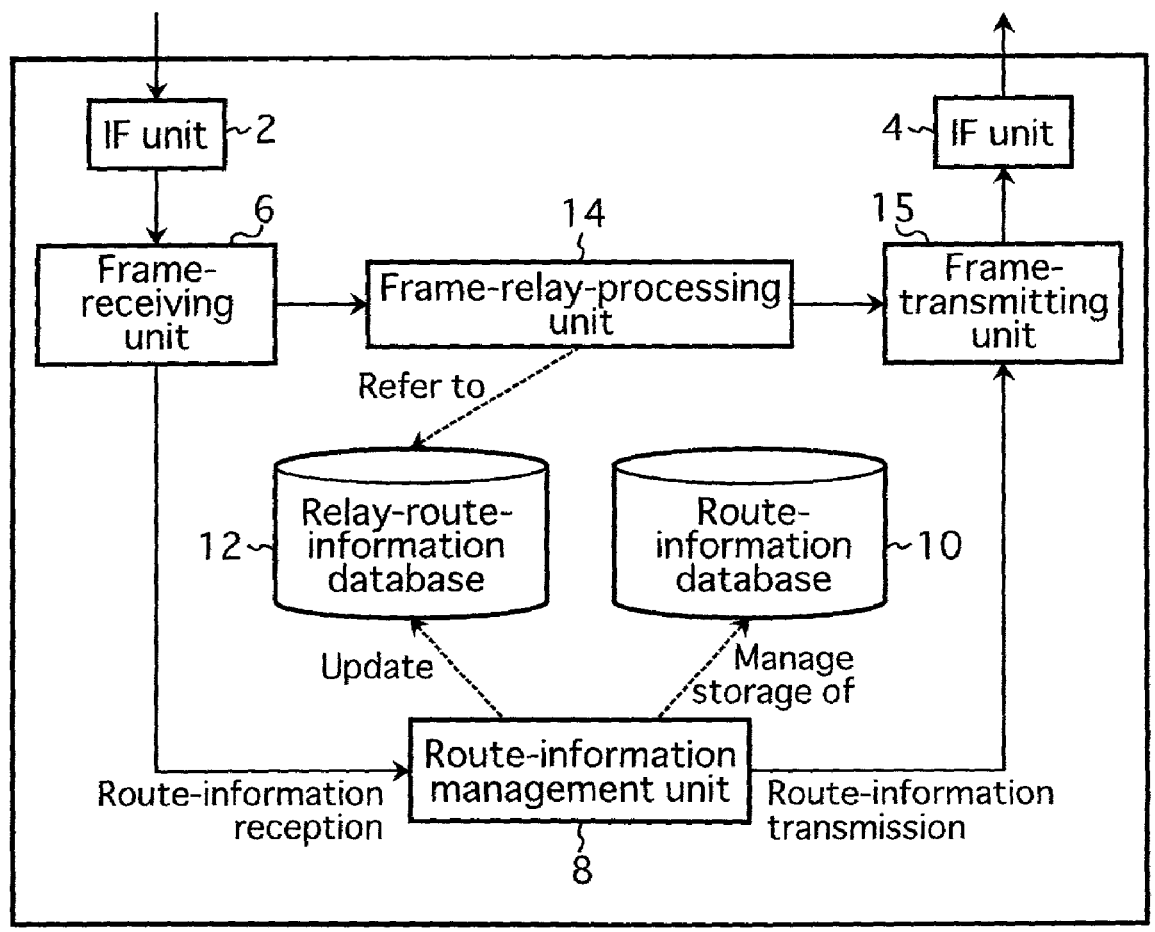
FIG. 17 is a diagram showing the configuration of the conventional router.
Figure 18:
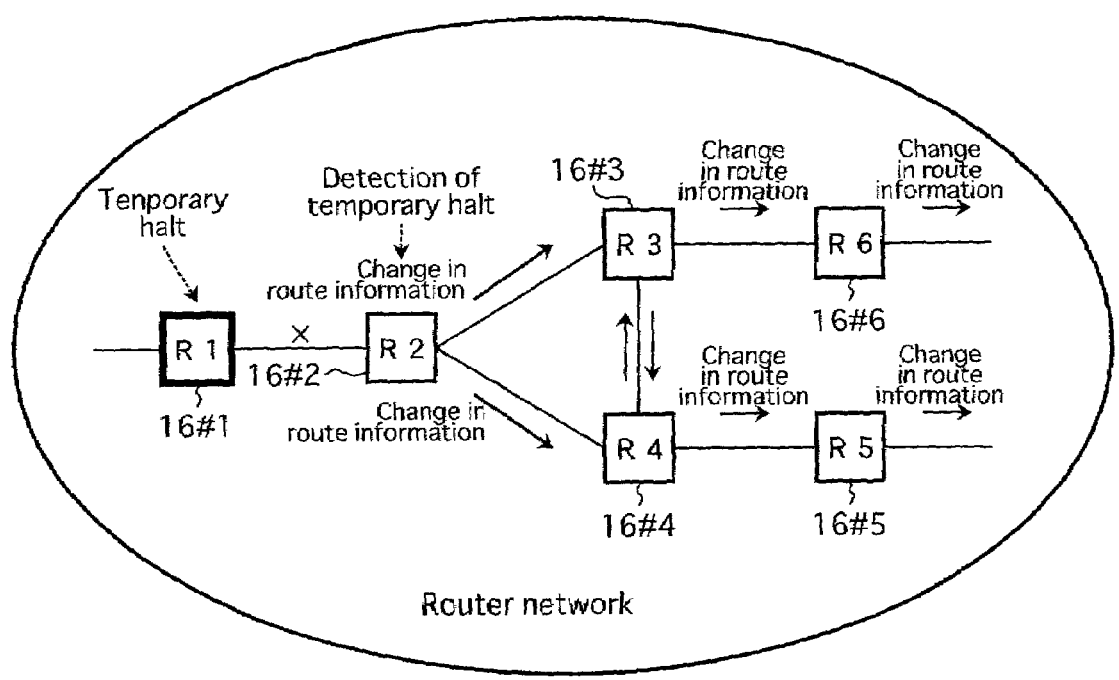
FIG. 18 is a diagram showing flows of a route-change notification in the event of a temporary halt.

FIG. 3 is a diagram showing the configuration of the router 30#i employed in the router network shown in FIG. 2. Components of the router 30#i that are virtually identical with their respective counterparts employed in the conventional router shown in FIG. 17 are denoted by the same reference numerals as the counterparts. As shown in FIG. 3, the router 30#i comprises IF units 2#i and 4#i, a frame-receiving unit 40#i, a route-information management unit 42#i, a frame-relay-processing unit 14#i, a frame-transmitting unit 44#i, a route-information database 43#i, a relay-route-information database 12#i, an apparatus-start/halt management unit 46#i, a route-information-saving unit 48#i, a route-information-saving memory 50#i, a temporary-halt-start-informing unit 52#i, a route-information-restoring unit 54#i, a temporary-halt-recovery-informing unit 56#i, a route-information-temporarily-locking unit 58#i and a route-information-temporary-lock-ending unit 60#i. The IF unit 2#i interfaces with each input transmission line, so that the IF unit 2#i receives-a frame therefrom and then outputs the received frame to the frame-receiving unit 40#i. On the other hand, the IF unit 4#i interfaces with each output transmission line, so that the IF unit 4#i transmits a received frame to a corresponding transmission line.

The frame-receiving unit 40#i checks the contents of a received frame and carries out the following processing in accordance with the contents of the frame:

(i) Pass on the received frame to the route-information management unit 42#i if the contents are found out to be information on a route. That is to say, the received frame is a frame destined for this router 30#i, and a message code included in the received frame indicates information on a route.

(ii) Pass on the received frame to the route-information-temporarily-locking unit 58#i if the contents of the received frame are found out to be a notification of a start of a temporary halt. That is to say, the received frame is a frame destined for this router 30#i, and a message code included in the received frame indicates a notification of a start of a temporary halt.

(iii) Pass on the received frame to the route-information-temporary-lock-ending unit 60#i if the contents of the received frame are found out to be a notification of a recovery from a temporary-halt. That is to say, the received frame is a frame destined for this router 30#i, and a message code included in the received frame indicates a recovery from a temporary halt.

(iv) Pass on the received frame to the frame-relay-processing unit 14#i if the frame is not a frame destined for this router 30#i. The frame-relay-processing unit 14#i searches the relay-route-information database 12#i for an adjacent router for the destination of the received frame.

The route-information management unit 42#i has the following functions:

(i) Store received information on a route in the route-information database 43#i.

(ii) Refer to the route-information database 43#i to determine an adjacent router on an optimum route for a destination address of a received frame. In the case of an IP network, the destination address is an address in the network.

(iii) Store relay route information indicating an adjacent router to serve as a relaying router for the transmission-destination address of each received frame in the relay-route-information database 12#i.

(iv) Update the route-information database 43#i to indicate that information on a route for the-address of a transmission destination has been saved when receiving a start/halt notification from the apparatus-start/halt management unit 46#i.

(v) Lock an operation to report a change in information on a route involving a specific adjacent router issuing a start of a temporary halt to adjacent routers other than the specific adjacent router when receiving a notification to start locking an operation to report a change in information on a route involving a specific adjacent router to adjacent routers other than the specific adjacent router from the route-information-temporarily-locking unit 58#i. Normally, when information on a route has not been received from a specific adjacent router for at least a predetermined period of time, a change in information on a route involving the specific adjacent router is not reported to adjacent routers other than the specific adjacent routers.

(vi) Resume an operation to report a change in information on a route involving a specific adjacent router to adjacent routers other than the specific adjacent router when receiving a notification of an end of the locked operation to report a change in information on a route involving the specific adjacent router to adjacent routers other than the specific adjacent router from the route-information-temporary-lock-ending unit 60#i.

(vii) Create a message for reporting a change in information on a route involving a specific adjacent router to adjacent routers other than the specific adjacent router when receiving no information on a route from the specific adjacent router for at least a predetermined period of time, or when receiving a notification of a recovery from a temporary halt from a specific adjacent router, and output the message to the frame-transmitting unit 44#i. Such a notification of a recovery from a temporary halt will cause a notification of an end of a locked operation to report a change in information on a route involving the specific adjacent router to adjacent routers other than the specific adjacent router to be received from the route-information-temporary-lock-ending unit 60#i. The specific adjacent router must not be an adjacent router issuing a notification of a start of a temporary halt. Such a notification of a start of a temporary halt will cause a notification to start locking an operation to report a change in information on a route involving the specific adjacent router to adjacent routers other than the specific-adjacent router to be received from the route-information-temporarily-locking unit 58#i.

FIG. 4 is a diagram showing the configuration of the route-information database 43#i used in the router 30#i shown in FIG. 3. As shown in FIG. 4, the route-information database 43#i includes status and a transmission-source router for each transmission-destination address in addition to information on a route and other information. The transmission-destination address is the address of a transmission destination of a frame. The address of a transmission destination of a frame is typically the network address of a terminal serving as the destination of the transmission. The transmission-source router is an adjacent router transmitting information on a route involving the transmission-destination address. The status is information for controlling information on a route in the event of a temporary halt. To be more specific, this status is the status of an adjacent router involved in the address of the transmission destination. There are 3 values of this status, namely, normal, saved and locked. The normal status indicates that an adjacent router specified in the information on a route is not in a state of being temporarily halted. The saved status indicates that the router 30#i including this route-information database 43#i is in a state of being temporarily halted and its information on a route has been saved in the route-information-saving memory 50#i. When the router 30#i including this route-information database 43#i is recovered from the temporary halt, the information on a route is restored from the route-information-saving memory 50#i to the route-information database 43#i, and the saved status is restored to the normal status. The locked status indicates that the router 30#i including this route-information database 43#i has received a notification of a start of a temporary halt from a specific adjacent router specified in the information on a route. The router 30#i in the locked status does not report a change in information on a route involving the specific adjacent router to adjacent routers other than the specific adjacent router. The locked status is restored to the normal status when the router 30#i including this route-information database 43#i receives a notification of a recovery from the temporary halt from the specific adjacent router.

The relay-route-information database 12#i contains information on an adjacent router serving as a relay destination for each transmission destination. The apparatus-start/halt management unit 46#i has the following functions:

(i) Inform the route-information management unit 42#i and the route-information-saving unit 48#i of a start of a temporary halt when receiving a request for a temporary halt. Normally, the request is entered by a person in charge of the network through a man-machine interface between the a person in charge of the network and the router 30#i. The router 30#i is temporarily halted for example when the version of the software employed in the router 30#i is upgraded.

(ii) Inform the route-information-restoring unit 54#i of a recovery from a temporary halt when receiving a notice of a recovery from the temporary halt. Normally, the notice is entered by the person in charge of the network through the man-machine interface between the person in charge of the network and the router 30#i.

Informed of a start of a temporary halt by the apparatus-start/halt management unit 46#i, the route-information-saving unit 48#i reads out information on a route and information on a session involving a transfer of a frame between an adjacent router and the router 30#i, saving these pieces of information in the route-information-saving memory 50#i. The route-information-saving unit 48#i then changes the status of the information on a route to saved status. The information on a route and the information on a session are saved in the route-information-saving memory 50#i because it is feared that these pieces of information may be inadvertently erased from the route-information database 43#i during the temporary halt. If the information on a route and the information on a session are inadvertently erased from the route-information database 43#i, frame-relay processing cannot be carried out till the information on a route is gathered from an adjacent router and a session with the adjacent router is reestablished. That is to say, the frame-relay processing cannot be resumed by merely restoring the router 30#i to a state prior to the temporary halt unless the information on a route is gathered from an adjacent router and a session with the adjacent router is reestablished. The route-information-saving memory 50#i is a non-volatile memory used for saving information on routes and information on sessions. By saving such pieces of information in a non-volatile memory, the information can be prevented from being inadvertently erased from the memory during the temporary halt.

Informed of a start of a temporary halt by the apparatus-start/halt management unit 46#i, the temporary-halt-start-informing unit 52#i creates a message used for notifying adjacent routers of a start of a temporary halt, and uses the address of each of the routers as a destination of the message. The temporary-halt-start-informing unit 52#i then supplies the temporary-halt-start notification message to the frame-transmitting unit 44#i. The route-information-restoring unit 54#i has the following functions:

(i) Read out information on a route and information on a session from the route-information-saving memory 50#i, supply the pieces of information to the route-information management unit 42#i and request the route-information management unit 42#i to restore the pieces of information to the route-information database 43#i when receiving a notification of a recovery from a temporary halt from the apparatus-start/halt management unit 46#i.

(ii) Delete the information on a route as well as the information on a session from the route-information-saving memory 50#i and inform the temporary-halt-recovery-informing unit 56#i that the restoration of the pieces of information to the route-information database 43#i has been completed after the route-information management unit 42#i completes the restoration.

Informed by the route-information-restoring unit 54#i that the restoration of the pieces of information to the route-information database 43#i has been completed, the temporary-halt-recovery-informing unit 56#i creates a message used for notifying adjacent routers of a recovery from the temporary halt, and uses the address of each of the routers as a destination of the message. The route-information-restoring unit 54#i then supplies the temporary-halt-recovery notification message to the frame-transmitting unit 44#i.

When the frame-receiving unit 40#i receives a notification of a start of a temporary halt from a specific adjacent router, the route-information-temporarily-locking unit 58#i requests the route-information management unit 42#i to start locking an operation to report a change in information on a route involving the specific adjacent router to adjacent routers other than the specific adjacent router. When the frame-receiving unit 40#i receives a notification of a recovery from a temporary halt from a specific adjacent router, the route-information-temporary-lock-ending unit 60#i requests the route-information management unit 42#i to unlock a locked operation to report a change in information on a route involving the specific adjacent router to adjacent routers other than the specific adjacent router.

Figure 5:
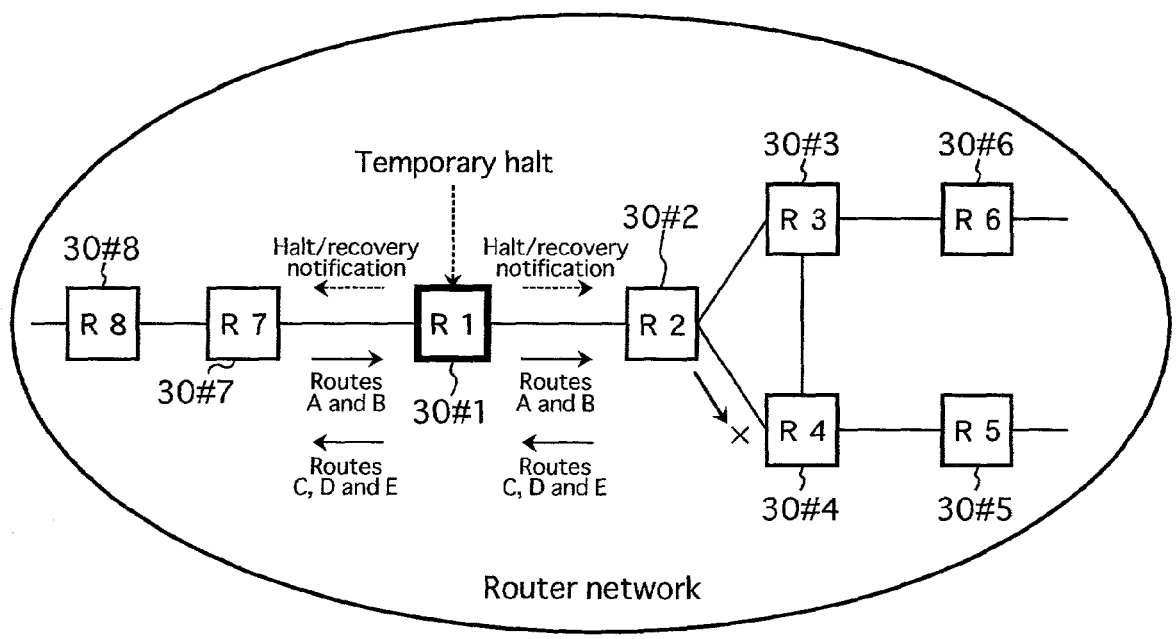
FIG. 5 is an explanatory diagram used for describing operations of a temporary halt and a recovery from the temporary halt in the router network.
Figure 6:
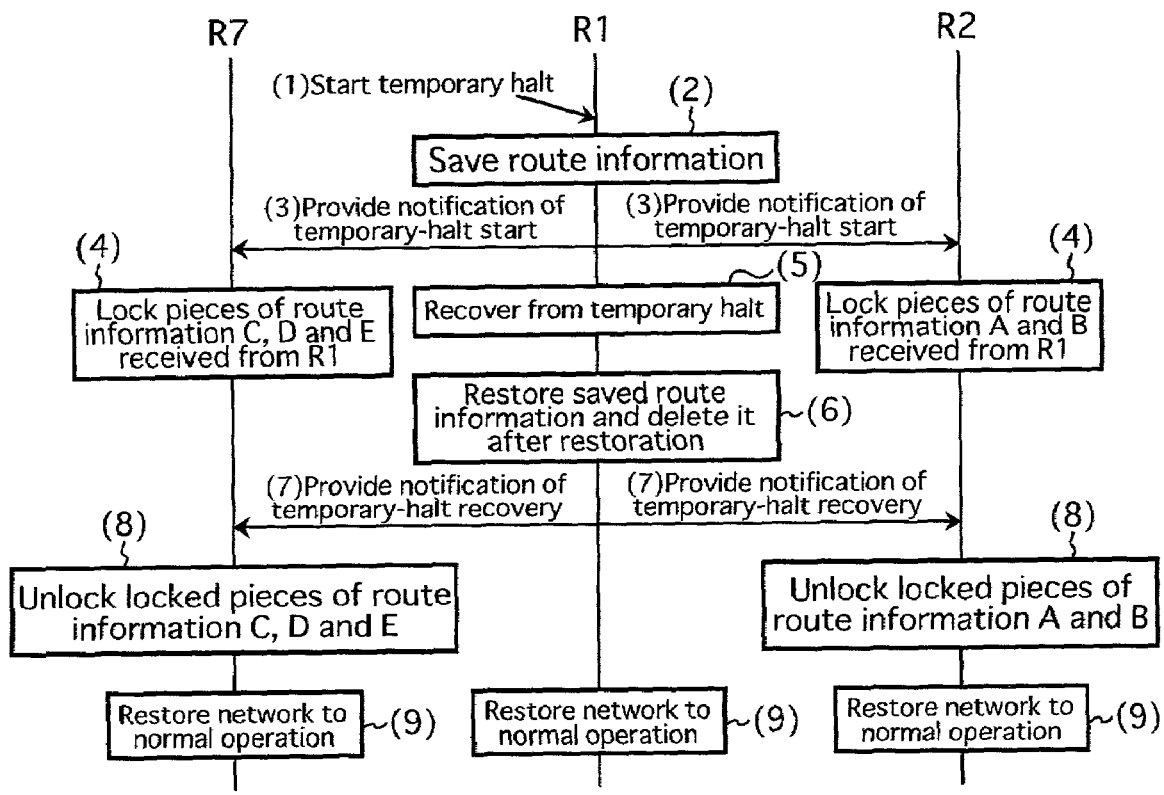
FIG. 6 shows a sequence chart of a temporary halt and a recovery from the temporary halt in the router network.
Figure 7:
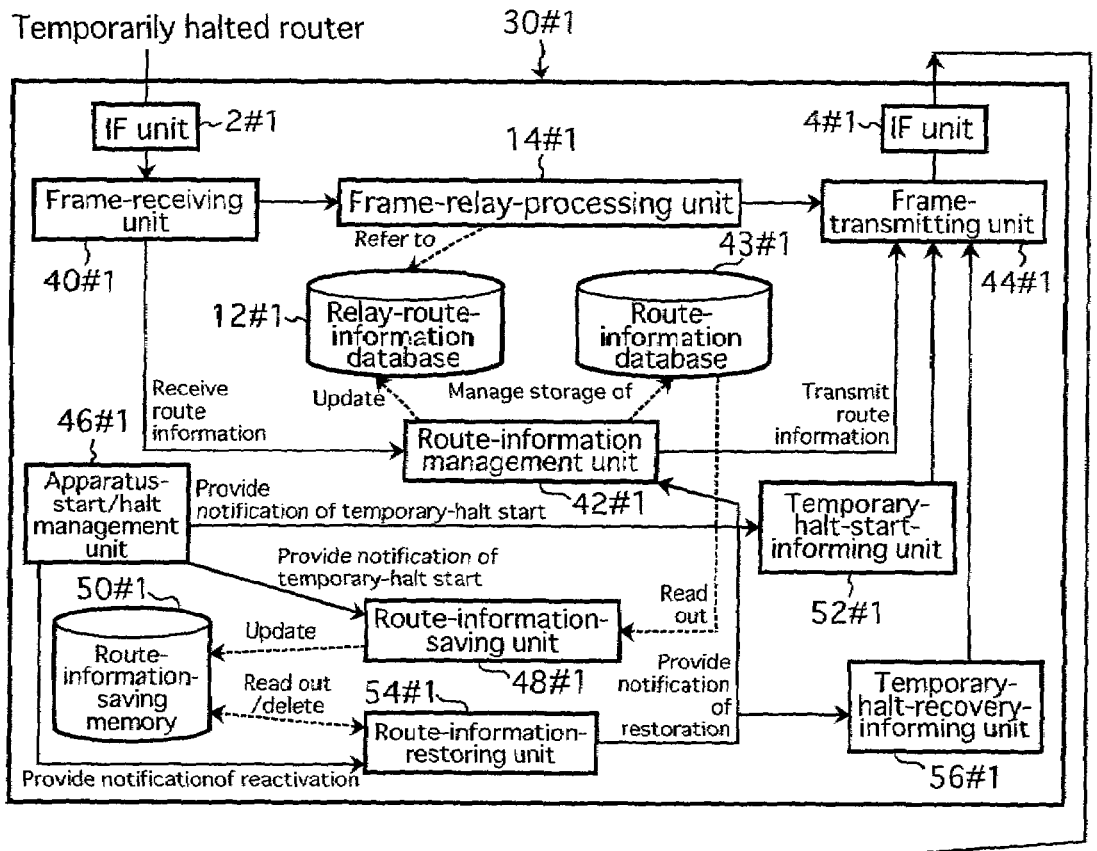
FIG. 7 is a diagram showing flows of signals between a temporarily halted router and a router adjacent to the temporarily halted router.
Figure 7:
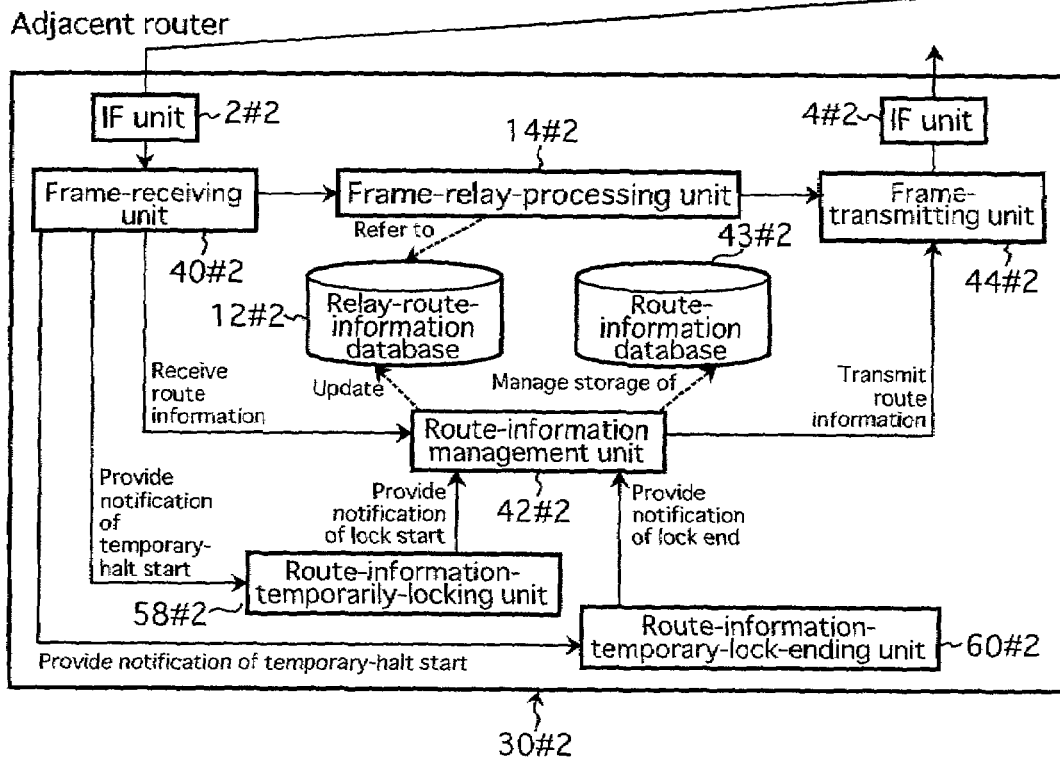

FIG. 5 is an explanatory diagram used for describing operations of a temporary halt and a recovery from the temporary halt in the router network. FIG. 6 shows a sequence chart of a temporary halt and a recovery from the temporary halt in the router network. FIG. 7 is a diagram showing flows of signals between a temporarily halted router and its adjacent router. By using a case, in which the router 30#i carries out operations of a temporary halt and a recovery from the temporary halt, as an example, the operation of the router network is explained with reference to FIGS. 5 to 7.

1: Prior to a Temporary Halt of the Router 30#i.

In accordance with a predetermined protocol such as the RIP or OSPF protocol, the route-information management unit 42#i employed in each of the routers 30#i where i=1, 2 and so on transmits information on a subnet directly subordinate to the router 30#i including the route-information management unit 42#i to all adjacent routers by way of the frame-transmitting unit 44#i and the IF unit 4#i. The information on a subnet is the information on a route which is described earlier. The route-information management unit 42#i stores route information received by the frame-receiving unit 40#i from a specific adjacent router through the IF unit 2#i in the route-information database 43#i along with the address of the specific adjacent router. The route information received from the specific adjacent router is then passed on to adjacent routers other than the specific adjacent router by way of the frame-transmitting unit 44#i and the IF unit 4#i. The route-information management unit 42#i puts the route information stored in the route-information database 43#i in normal status. As shown in FIG. 5, assume that, for example, the router 30#1 receives information on a route to transmission destinations A and B from the router 30#7. On the other hand, the router 30#2 receives information on a route to transmission destinations C and D from the router 30#3 as well as information on a route to a transmission destination E from the router 30#4.

FIG. 8 is diagrams each showing contents of the route-information database 43#i employed in a router 30#i prior to a temporary halt. To be more specific, FIG. 8A is a diagram showing contents of the route-information database 43#1 employed in the router 30#1 prior to the temporary halt of the router 30#1. FIG. 8B is a diagram showing contents of the route-information database. 43#2 employed in the router 30#2 prior to the temporary halt of the router 30#1. FIG. 8C is a diagram showing contents of the route-information database 43#7 employed in the router 30#7 prior to a temporary halt of the router 30#1. In the route-information database 43#1 shown in FIG. 8A, routers serving as transmission sources for transmission destinations A and B are the router 30#7 with normal status whereas routers serving as transmission sources for transmission destinations C, D and E are the router 30#2 with normal status. In the route-information database 43#2 shown in FIG. 8B, routers serving as transmission sources for transmission destinations A and B are the router 30#1 with normal status, routers serving as transmission sources for transmission destinations C and D are the router 30#3 with normal status whereas a router serving as a transmission source for transmission destination E is the router 30#4 with normal status. In the route-information database 43#7 shown in FIG. 8C, routers serving as transmission sources for transmission destinations A and B are the router 30#8 with normal status whereas routers serving as transmission sources for transmission destinations C, D and E are the router 30#1 with normal status.

The route-information management unit 42#i determines an adjacent router for optimum routing for each transmission destination from the route-information database 43#i in accordance with a predetermined protocol. Then, the adjacent router for optimum routing for each transmission destination is stored in the relay-route-information database 12#i. The frame-relay-processing unit 14#i searches the relay-route-information database 12#i for an adjacent router suitable for the destination of a frame received from the IF unit 2#i and the frame-receiving unit 40#i. The adjacent router found in the search is used as a relay destination of the frame. Then, the frame is transmitted to the adjacent router used as a relay destination of the frame by way of the frame-transmitting unit 44#i and the IF unit 4#i. In this way, a frame is routed by the router 30#i and transmitted to a destination terminal or the like. The route-information management unit 42#i also monitors arrivals of information on a route from adjacent routers in accordance with a predetermined protocol. If information on a route is not received from a specific adjacent router for a predetermined period of time, and the status of information on a route involving the specific adjacent router is normal in the route-information database 43#i, a message reporting a change in information on a route involving the specific adjacent router is transmitted to adjacent routers other than the specific adjacent router by way of the frame-transmitting unit 44#i and the IF unit 4#i.

2: Temporary Halt of the Router 30#1

A temporary halt of the router 30#1 is started when a person in charge of the network management enters a command indicated by reference numeral (1) in FIG. 6 to the apparatus-start/halt management unit 46#i to temporarily halt the operation of the router 30#1 by way of a man-machine interface via a console not shown in the figure. Receiving the command to temporarily halt the operation of the router 30#1, the apparatus-start/halt management unit 46#i informs the route-information-saving unit 48#1 and the temporary-halt-start-informing unit 52#1 of a start of a temporary halt as shown in FIG. 7. The route-information-saving unit 48#1 reads out all pieces of information on a route and a set of pieces of information on sessions involving exchanges of frames with adjacent routers from the route-information database 43#1 and stores all the pieces of information on a route and the set of pieces of information on sessions in the route-information-saving memory 50#1 as indicated by reference numeral (2) in FIG. 6, setting all the pieces of information on a route in saved status. FIG. 9A is a diagram showing contents of the route-information database 43#1 employed in the router 30#1 during the temporary halt of the router 30#1. In the route-information database 43#1 shown in FIG. 9A, the status of the information on a route for each of transmission destinations A, B, C, D and E is saved status.

Then, as indicated by reference numeral (3) shown FIG. 6, the temporary-halt-start-informing unit 52#1 employed in the router 30#1 notifies the adjacent routers 30#2 and 30#7 of a start of the temporary halt by way of the frame-transmitting unit 44#1 and the IF unit 4#1. Informed of the start of the temporary halt, the adjacent routers 30#2 and 30#7 carry out the same operations. Only the operation performed by the adjacent router 30#2 is explained as follows.

The frame-receiving unit 40#2 employed in the adjacent router 30#2 passes on the temporary-halt-start notification received from the router 30#1 to the route-information-temporarily-locking unit 58#2. Receiving the notification of the start of the temporary halt, the route-information-temporarily-locking unit 58#2 informs the route-information management unit 42#2 of a lock start. Informed of the lock start, the route-information management unit 42#2 changes the status of route information originated from the temporarily halted router 30#1 in the route-information database 43#2 to locked status as shown by reference numeral (4) in FIG. 6. Then, an operation to report a change in information on a route involving the temporarily halted router 30#1 to adjacent routers other than the router 30#1 is halted. That is to say, an operation to report a change in information on a route involving the router 30#1 is discontinued for the locked status of the information even if no information on a route has been received from the router 30#1 for at least a predetermined period.

FIG. 9B is a diagram showing contents of the route-information database 43#2 employed in the router 30#2 during the temporary halt of the router 30#1. In the route-information database 43#2 shown in FIG. 9B, the status of the information on a route for the router 30#1 serving as a transmission source and for transmission destinations A and B is locked status while the status of the information on a route for the router 30#3 and the router 30#4 serving as transmission sources and for transmission destinations C, D and E remains as normal status.

FIG. 9C is a diagram showing contents of the route-information database 43#7 employed in the router 30#7 during the temporary halt of the router 30#1. In the route-information database 43#7 shown in FIG. 9C, the status of the information on a route for the router 30#1 serving as a transmission source and for transmission destinations C, D and E is locked status while the status of the information on a route for the router 30#8 serving as a transmission source and for transmission destinations A and B remains as normal status.

While the router 30#1 is being temporarily halted, the routers 30#2 and 30#7 which are adjacent to the router 30#1 may receive a frame to be relayed to the router 30#1 in accordance with relay route information. In this case, such a frame may be just discarded or transmitted to the temporarily halted router 30#1. As an alternative, the frame is preserved till the temporarily halted router 30#1 is recovered from the temporary halt. As the temporarily halted router 30#1 is recovered from the temporary halt, the preserved frame is relayed to the router 30#1.

3: Recovery of the Router 30#1 from the Temporary Halt

As maintenance work such as work to upgrade the version of software employed in the router 30#1 is completed, the person in charge of the network management gives a command indicating a recovery from the temporary halt to the apparatus-start/halt management unit 46#1 as indicated by reference numeral (5) shown in FIG. 6 through the man-machine interface from the console not shown in the figure. Receiving the command, the apparatus-start/halt management unit 46#1 informs the route-information-restoring unit 54#1 of resumption. Informed of the resumption, the route-information-restoring unit 54#1 reads out information on a route and information on sessions with the adjacent routers 30#2 and 30#7 from the route-information-saving memory 50#1. The route-information-restoring unit 54#1 supplies these pieces of information to the route-information management unit 42#1, requesting the route-information management unit 42#1 to store back the information into the route-information database 43#1. The route-information management unit 42#1 stores back the information on a route and the information on sessions, which have been received from the route-information-restoring unit 54#1, into the route-information database 43#1 as indicated by reference numeral (6) in FIG. 6, restoring the status of the information on a route to normal. The route-information management unit 42#1 also updates the relay-route-information database 12#1 on the basis of the information on a route and the information on sessions which have been restored to the route-information database 43#1. In this way, the information on a route prior to the temporary halt can be restored without newly gathering information on a route from adjacent routers even if data stored in the route-information database 43#1 is destroyed. As a result, the router 30#1 is again capable of routing frames immediately.

FIG. 10A is a diagram showing contents of the route-information database 43#1 in the temporarily halted router 30#1 after a recovery from the temporary halt. As shown in the figure, the status of information routes in the route-information database 43#1 has been restored to normal for transmission destinations A, B, C, D and E. After the route-information management unit 42#1 restores the information on a route and the information on sessions to the route-information database 43#1, the route-information-restoring unit 54#1 deletes the information on a route and the information on sessions with the adjacent routers 30#2 and 30#7 from the route-information-saving memory 50#1 as indicated by reference numeral (6) in FIG. 6. As described above, the information on a route and the information on sessions were saved in the route-information-saving memory 50#1 when the router 30#1 was temporary halted. Then, the route-information-restoring unit 54#1 informs the temporary-halt-recovery-informing unit 56#1 of a recovery from the temporary halt. Informed of the recovery, the temporary-halt-recovery-informing unit 56#1 transmits a frame for informing the recovery from the temporary halt from the router 30#1 to the adjacent routers 30#2 and 30#7 by way of the frame-transmitting unit 44#1 and the IF unit 4#1 as indicated by reference numeral (7) in FIG. 6. The frame-receiving unit 40#2 employed in the adjacent router 30#2 passes on the temporary-halt-recovery notification received from the router 30#1 destined for the adjacent router 30#2 itself to the route-information-temporary-lock-ending unit 60#2. Receiving the notification of the recovery from the temporary halt, the route-information-temporary-lock-ending unit 60#2 requests the route-information management unit 42#2 to end the locked state. Requested by the route-information-temporary-lock-ending unit 60#2 to end the locked state, the route-information management unit 42#2 restores the locked status of information on a route indicating the temporarily halted router 30#1 as a transmission source in the route-information database 43#2 to the normal status. Thereafter, the operation to detect and report a change in information on a route involving the router 30#1 to adjacent routers other than the router 30#1 is resumed.

FIG. 10B is a diagram showing contents of the route-information database 43#2 in the router 30#2 after the temporarily halted router 30#1 is recovered from the temporary halt. As shown in the figure, the status of information routes in the route-information database 43#2 has been restored to normal for transmission destinations A and B.

FIG. 10C is a diagram showing contents of the route-information database 43#7 in the router 30#7 after the temporarily halted router 30#1 is recovered from the temporary halt. As shown in the figure, the status of information routes in the route-information database 43#7 has been restored to normal for transmission destinations C, D and E.

As described above, synchronization of information on a route can be established between the temporarily halted router 30#1 and the adjacent router 30#2 as well as the adjacent router 30#7 without the need to exchange information on a route between the temporarily halted router 30#1 and the adjacent router 30#2 as well as the adjacent router 30#7, allowing the information on a route to be stabilized within a short period of time. In addition, while the router 30#1 is being temporarily halted, the adjacent routers 30#2 and 30#7 each temporarily discontinue the operation to report a change in information on a route involving the router 30#1 to adjacent routers other than the router 30#1. It is thus possible to avoid unnecessary dissemination of a change in information on a route involving the router 30#1 to routers 30#i throughout the network. As a result, the time required to stabilize information on a route throughout the entire network can be shortened.

Figure 11A:
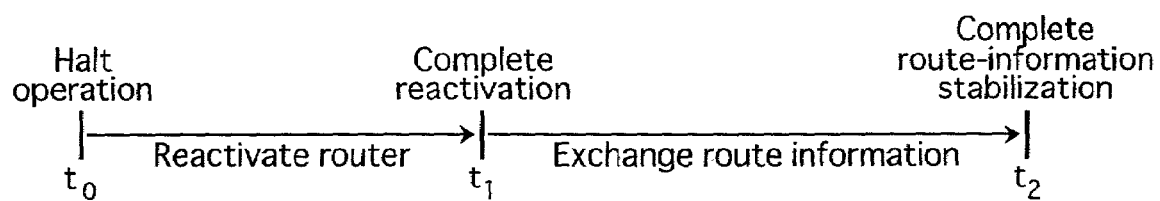
FIG. 11A is an explanatory diagram used for describing effects of the first embodiment.
Figure 11B:
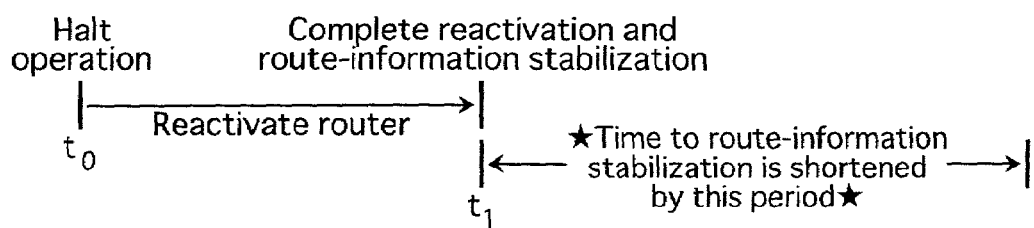
FIG. 11B is an explanatory diagram used for describing the effects of the first embodiment.

FIG. 11A is an explanatory diagram used for describing a period of time between the start of a temporary halt and the end of stabilization of information on a route in the conventional router network. On the other hand, FIG. 11B is an explanatory diagram used for describing a period of time between the start of a temporary halt and the end of stabilization of information on a route in the router network implemented by the first embodiment. As shown in FIG. 11A, the temporary halt is started at a point of time t0 and ended at a point of time t1. During the temporary halt, a change in information on a route is disseminated to all routers throughout the network through the temporarily halted router. As the temporarily halted router is recovered from the temporary halt at the point of time t1, information on a route is exchanged for restoring routes involving the router to its original state so that it takes time to stabilize information on a route.

In the case of the first embodiment, on the other hand, during the temporary halt starting at the point of time t0, no change in information on a route involving the temporarily halted router is reported. All routes passing through the temporarily halted router are not modified. Thus, as the temporarily halted router is recovered from the temporary halt at the point of time t1, information on a route can be brought back to its original state prior to the temporary halt by merely restoring route information saved before the temporary halt. As a result, the information on a route can be stabilized within a short period of time. To put it concretely, the time required to stabilize information on a route throughout the entire network in the first embodiment can be shortened by a period of time between the point of time t1 and a point of time t2 in comparison with the conventional router network.

As described above, in accordance with the first embodiment, when the operation of a router is temporarily halted, a halt notification is clearly indicated and, as the router is recovered from the temporary halt, a recovery notification is also clearly indicated as well so that route information prior to the temporary halt can be utilized and information on routes of the network can be stabilized right after the router is recovered from the temporary halt due to elimination of the unnecessary dissemination of a change in information on a route involving the temporarily halted router to routers throughout the entire network. As a result, the time required to get information on a route stabilized throughout the entire network can be considerably shortened. In addition, it is also possible to deal with intermittent failures completely. The larger the number of routers composing the network, or the larger the scale of the router network, the greater the effect exhibited by the first embodiment.

Second Embodiment

Figure 12:
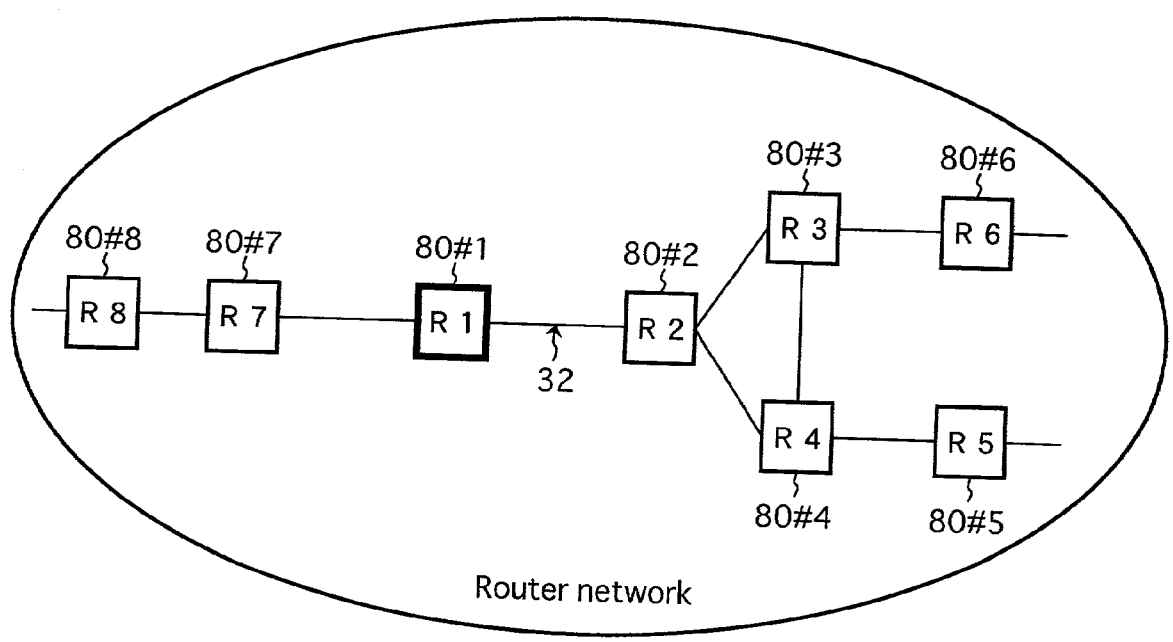
FIG. 12 is a diagram showing the configuration of a router network implemented by a second embodiment of the present invention.

FIG. 12 is a diagram showing the configuration of a router network implemented by a second embodiment of the present invention. Configuration elements of the second embodiment, which are virtually identical with their respective counterparts employed in the first embodiment shown in FIG. 2, are denoted by the same reference numerals as the counterparts. If a temporarily halted router cannot be recovered from a temporary halt as scheduled due to typically the fact that the router and/or a transmission line connected to the router fails, a router adjacent to the temporarily halted router cannot receive a notification of a recovery from the temporary halt from the temporarily halted router. The adjacent router may have been set not to report a change in information on a route involving the temporarily halted router to adjacent routers other than the temporarily halted router till a notification of a recovery from the temporary halt is received. In this case, there is raised a problem that it is impossible to relay a frame with relay route information set to relay the frame to the temporarily halted router. In order to solve this problem, the adjacent router regards the temporarily halted router as a router, in which a failure has occurred, and ends the locked state in case a notification of a recovery from the temporary halt has not been received even after a predetermined period of time has lapsed since reception of a notification of a start of the temporary halt from the temporarily halted router. With the locked state ended, the adjacent router resumes the-operation to report a change in information on a route involving the temporarily halted router to adjacent routers other than the temporarily halted router. The predetermined period of time is referred to as a lock end time. The predetermined period of time can be fixed in the system from the beginning. As an alternative, the lock end time can be transmitted by the temporarily halted router to the adjacent router along with the notification of a start of the temporary halt. In this case, the lock end time can be varied in dependence on the temporary halt's estimated length which depends on the type of work done during the temporary halt.

The router 80#i is different from the router 30#i in that, in the case of the 80#i, (i) a temporarily halted router transmits a lock end time along with a notification of a start of a temporary halt to an adjacent router, and (ii) if the lock end time lapses since the reception of the notification of a start of a temporary halt to an adjacent router, the adjacent router reports a change in information on a route involving the temporarily halted router to adjacent routers other than the temporarily halted router even if no notification of a recovery from the-temporary halt is received from the temporarily halted router.

Figure 13:
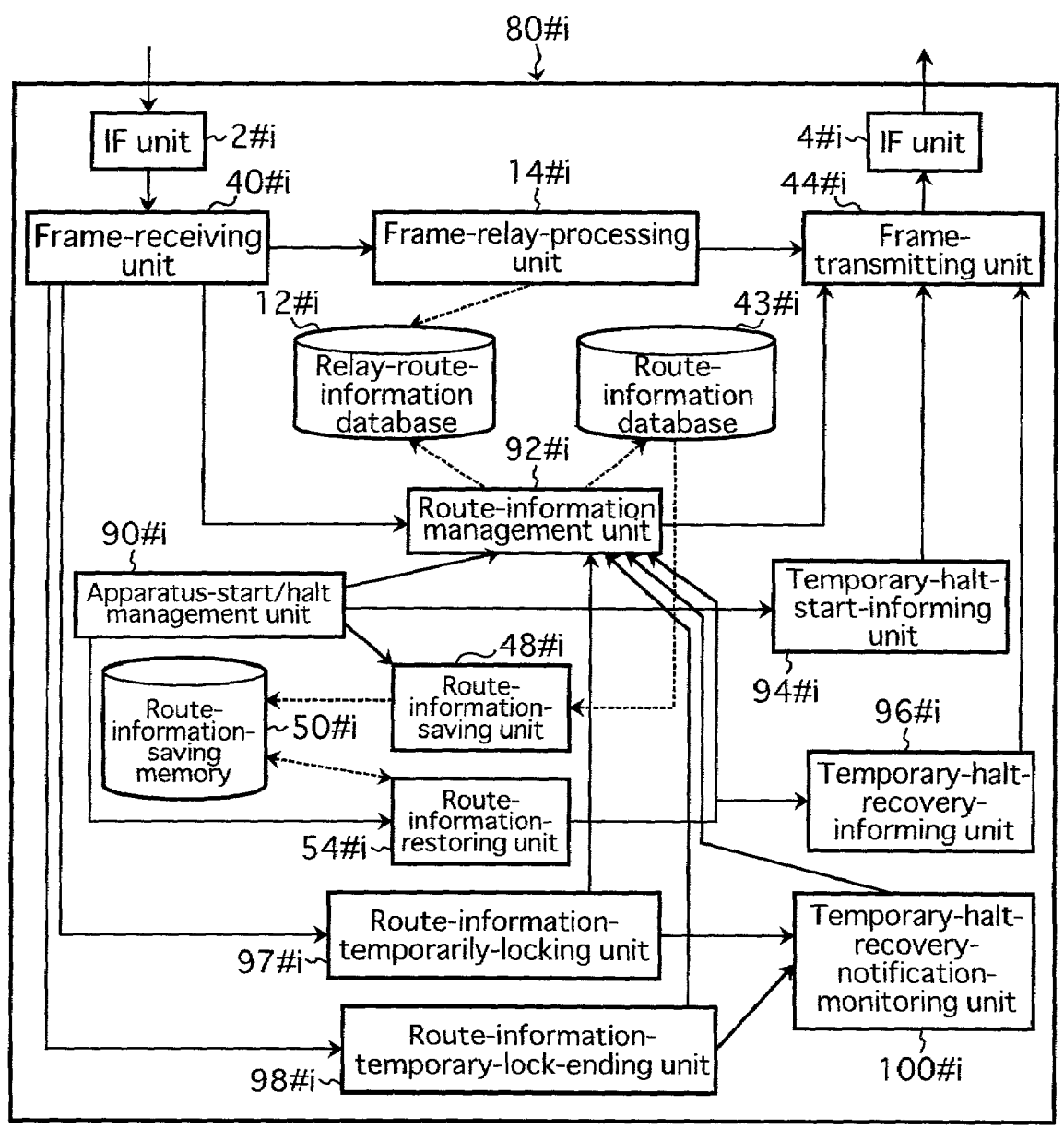
FIG. 13 is a diagram showing the configuration of a router employed in the router network shown in FIG. 12.

FIG. 13 is a diagram showing the configuration of the router 80#i employed in the router network shown in FIG. 12. Components of the router 80#i that are virtually identical with their respective counterparts employed in the router 30#i shown in FIG. 3 are denoted by the same reference numerals as the counterparts. In the following description, only differences from the configuration elements of the router 30#i shown in FIG. 3 are explained. An apparatus start/halt management unit 90#i passes on a notification of a start of a temporary halt and a lock end time, which are entered by a person in charge of network management through a man-machine interface between the a person in charge of network management and the router 80#i via a console not shown in the figure, to a temporary-halt-start-informing unit 94#i. When receiving a locked information elimination notification from a temporary-halt-recovery-notification-monitoring unit 100#i, a route-information management unit 92#i deletes route information involving the temporarily halted router and has been put in locked status, from the route-information database 43#i. The route-information management unit 92#i then resumes an operation to report a change in the information on a route to adjacent routers other than the temporarily halted router.

When receiving a notification of a start of a temporary halt and a lock end time from the apparatus start/halt management unit 90#i, the temporary-halt-start-informing unit 94#i creates a frame which includes the notification of a start of a temporary halt as well as the lock end time and is destined for adjacent routers other than the temporarily halted router employing the apparatus start/halt management unit 90#i and the temporary-halt-start-informing unit 94#i. The temporary-halt-start-informing unit 94#i then supplies the frame to the frame-transmitting unit 44#i. When receiving a notification of a start of a temporary halt, a route-information-temporarily-locking unit 96#i requests the temporary-halt-recovery-notification-monitoring unit 100#i to start monitoring the lapse of the lock end time. On the other hand, when receiving a notification of a recovery from a temporary halt, a route-information-lock-ending unit 98#i requests the temporary-halt-recovery-notification-monitoring unit 100#i to end an operation to monitor the lapse of the lock end time. The temporary-halt-recovery-notification-monitoring unit 100#i has the following functions:

(i) Start an operation to monitor the lapse of the lock end time. When the temporary-halt-recovery-notification-monitoring unit 100#i receives a notification of a start of a temporary halt and a lock end time from the route-information-temporarily-locking unit 97#i, the temporary-halt-recovery-notification-monitoring unit 100#i sets the lock end time as a timer value and starts a timer.

(ii) End an operation to monitor the lapse of the lock end time. When the temporary-halt-recovery-notification-monitoring unit 100#i receives a notification of a recovery from a temporary halt from the route-information-lock-ending unit 98#i, the temporary-halt-recovery-notification-monitoring unit 100#i stops the timer.

(iii) Supply a notification to eliminate locked information to the route-information management unit 92#i when the timer times out, that is, reaches the set timer value.

Figure 14:
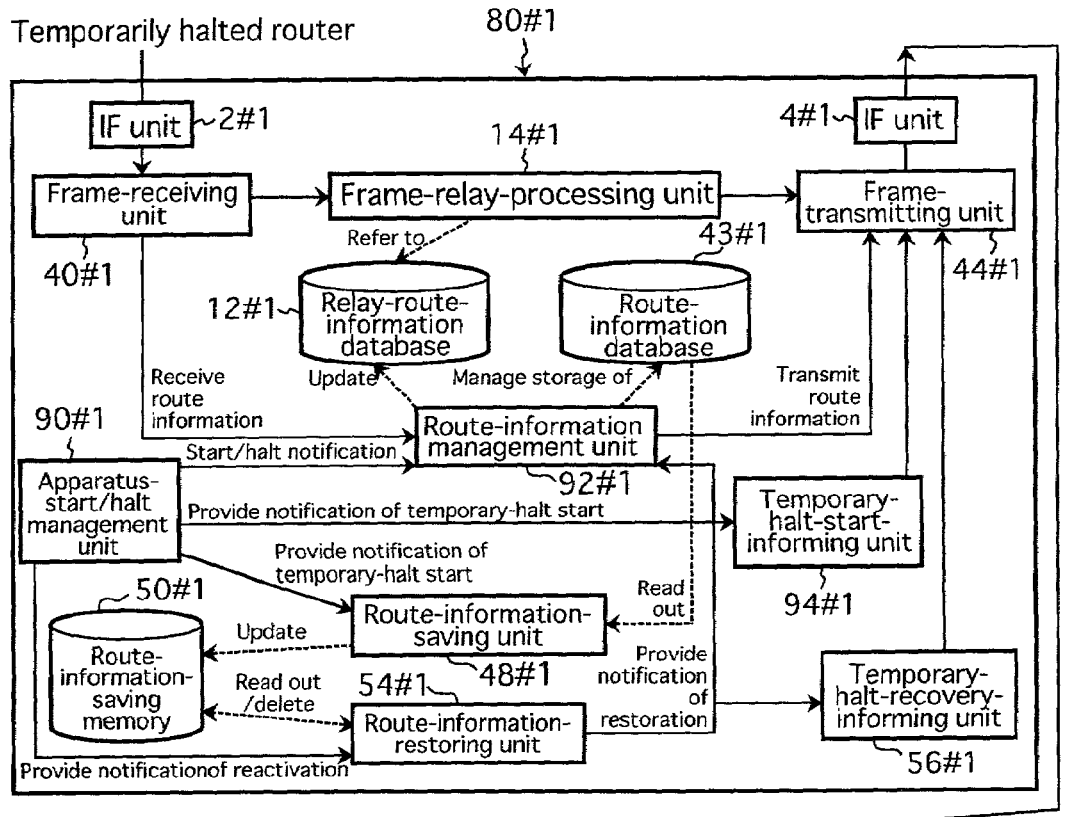
FIG. 14 is a diagram showing flows of signals between a temporarily halted router and a router adjacent to the temporarily halted router.
Figure 14:
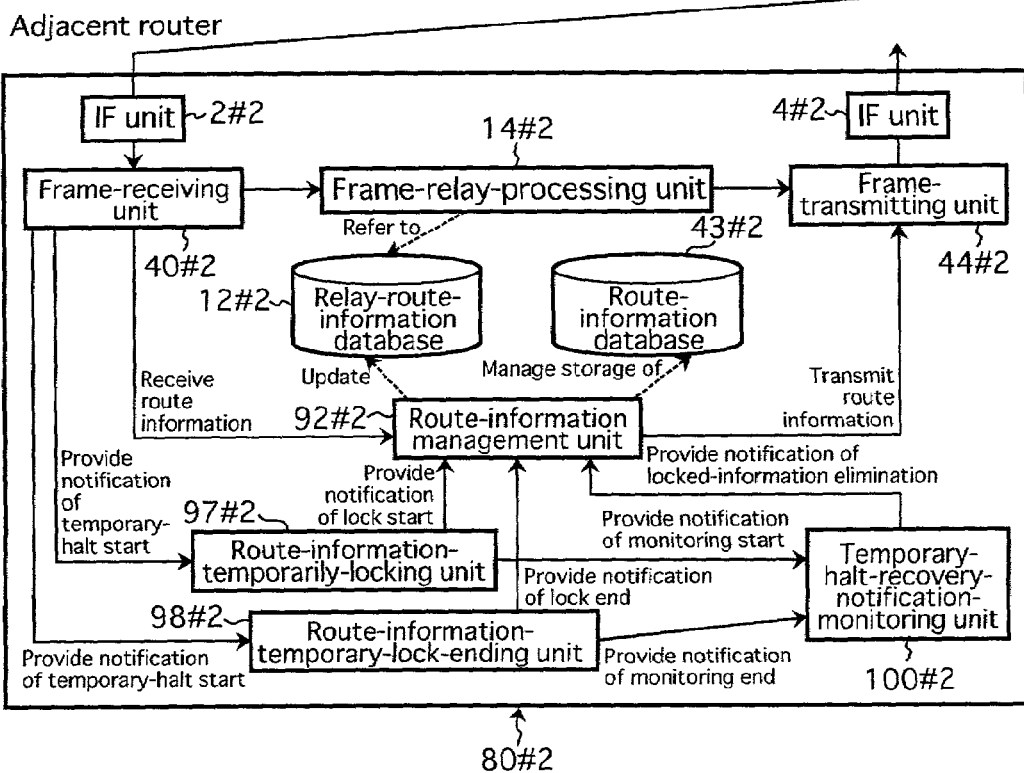
Figure 15:
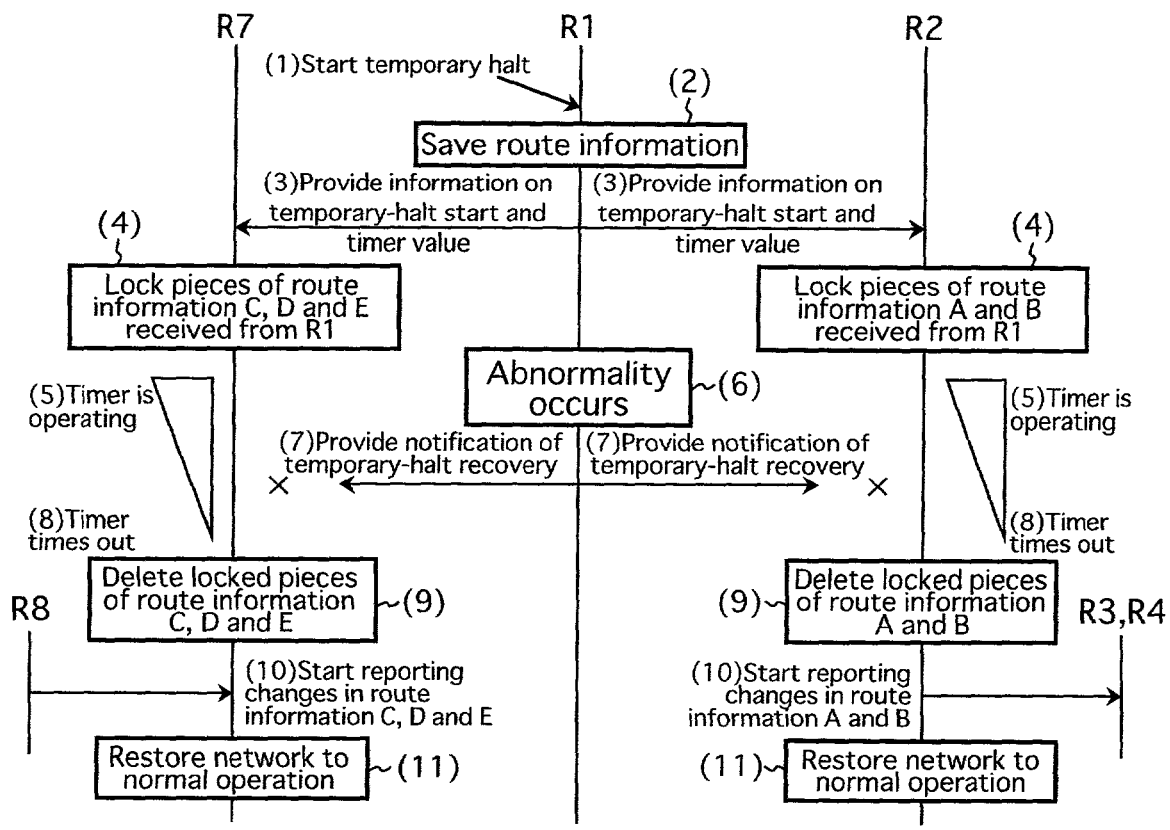
FIG. 15 shows a sequence chart of a temporary halt and a recovery from the temporary halt in the router network.

FIG. 14 is a diagram showing flows of signals between a temporarily halted router and a router adjacent to the temporarily halted router. FIG. 15 shows a sequence chart of a temporary halt and a recovery from the temporary halt in the router network in the event of an abnormality in a temporarily-halted router. By taking a temporary halt and a recovery from the temporary halt in the router 80#i as an example, the operation of the router network is explained with reference to FIGS. 14 and 15 as follows.

1: Since the operation of the 80#i prior to the temporary halt is the same as the first embodiment, the explanation of the operation is not repeated.

2: Temporary halt of the 80#1.

A temporary halt of the router 80#1 is started when a person in charge of network management enters a command indicated by reference numeral (1) in FIG. 15 to the apparatus start/halt management unit 90#1 to temporarily halt the operation of the 80#1 by way of a man-machine interface via a console not shown in the figure. The command includes a request for a start of a temporary halt and a lock end time to be set as a timer value. It should be noted that the timer value is a time length desired by the person in charge of network management. The time length is an estimated length of a time required to do maintenance work. The apparatus start/halt management unit 90#1 passes on the request for a start of a temporary halt to the route-information management unit 92#1. In addition, the apparatus start/halt management unit 90#1 passes on the request for a start of a temporary halt as well as the lock end time to the route-information-saving unit 48#1 and the temporary-halt-start-informing unit 94#1. Much like the first embodiment, the route-information-saving unit 48#1 saves information on a route as indicated by reference numeral (2) in FIG. 15. When receiving the request for a start of a temporary halt and the lock end time from the apparatus start/halt management unit 90#1, the temporary-halt-start-informing unit 94#1 creates a frame which includes the notification of a start of a temporary halt as well as the lock end time (or the timer value) and is destined for adjacent routers other than the temporarily halted router 80#1. The temporary-halt-start-informing unit 94#1 then transmits the frame to the adjacent routers 80#2 and 80#7 by way of the frame-transmitting unit 44#1 and the IF unit 4#1 as shown by reference numeral (3) in FIG. 15.

The frame-receiving unit 40#2 employed in the router 80#2 passes on the notification of a start of a temporary halt and the lock end time, which are transmitted by the router 80#1 and destined for the router 80#2, to the route-information-temporarily-locking unit 97#2. The route-information-temporarily-locking unit 97#2 passes on the notification of a start of a temporary halt to the route-information management unit 92#2 and the lock-end time to the temporary-halt-recovery-notification-monitoring unit 100#2. Much like the first embodiment, the route-information management unit 92#2 locks information on a route involving the temporarily-halted router 80#1 as indicated by reference numeral (4) in FIG. 15. On the other hand, the temporary-halt-recovery-notification-monitoring unit 100#2 sets the lock end time in the timer as a time value as indicated by reference numeral (5) in FIG. 15 and starts the timer.

3: A notification of a recovery from the temporary halt is received before a time-out.

Assume that the maintenance work such as work to upgrade the version of the software employed in the temporarily halted router 80#1 is completed normally in time. In this case, the person in charge of network management enters a command of reactivation to the apparatus start/halt management unit 90#1 via a console not shown in the figure. Thereafter, a notification of a recovery from the temporary halt is transmitted to the adjacent routers 80#2 and 80#7 in the same way as the first embodiment. The frame-receiving unit 40#2 employed in the adjacent router 80#2 passes on the notification of a recovery from the temporary halt received from the temporarily halted router 80#1 to the route-information-lock-ending unit 98#2. Receiving the notification of a recovery from the frame-receiving unit 40#2, the route-information-lock-ending unit 98#2 requests the route-information management unit 92#2 to end the locked state and requests the temporary-halt-recovery-notification-monitoring unit 100#2 to stop an operation to monitor the lapse of the lock end time.

Requested to stop monitoring the lapse of the lock end time, the temporary-halt-recovery-notification-monitoring unit 100#2 stops the timer to discontinue the monitoring operation. As described above, when a notification of a recovery from the temporary halt is received before a time-out, operations are carried out in the same way as the first embodiment. As a result, synchronization of information on a route can be established between the temporarily halted router 80#1 and the adjacent router 80#2 as well as the adjacent router 80#7 without the need to exchange information on a route between the temporarily halted router 80#1 and the adjacent router 80#2 as well as the adjacent router 80#7, allowing the information on a route to be stabilized within a short period of time. In addition, while the router 80#1 is being temporarily halted, the adjacent routers 80#2 and 80#7 each temporarily lock the operation to report a change in information on a route involving the router 80#1 to adjacent routers other than the router 80#1.

4: No notification of a recovery from the temporary halt is received before a time-out.

Assume that a software or hardware abnormality occurs during reactivation of the temporarily halted router 80#1 as shown by reference numeral (6) in FIG. 15. Thus, the routers 80#2 and 80#7 did not receive a notification of a recovery from the temporary halt within the lock end time since reception of the notification of a start of the temporary halt as indicated by reference numeral (7) and the cross marks X in FIG. 15. Since the temporary-halt-recovery-notification-monitoring unit 100#2 is not requested to stop the operation to monitor the lapse of the lock end time, the timer times out, that is, reaches the set timer value as indicated by reference numeral (8) in FIG. 15. When the timer times out, the temporary-halt-recovery-notification-monitoring unit 100#2 supplies a notification to eliminate locked information on a route to the route-information management unit 92#2 to request the route-information management unit 92#2 to eliminate the information on a route. When receiving the notification to eliminate locked information on a route from the temporary-halt-recovery-monitoring unit 100#2, the route-information management unit 92#2 deletes the information on a route, which involves the temporarily halted router 80#1 and has been put in locked status, from the route-information database 43#2 as indicated by reference numeral (9) in FIG. 15.

FIG. 16A is a diagram showing contents of the route-information database 43#2 in the adjacent router 80#2 after issuance of the notification to eliminate locked information on a route. As shown in FIG. 16A, the status of information on a route is changed to deleted status in the route-information database 43#2 for transmission destinations A and B for which have the temporarily halted router 80#1 serves as a transmission source. On the other hand, FIG. 16B is a diagram showing contents of the route-information database 43#7 in the adjacent router 80#7 after issuance of the notification to eliminate locked information on a route. As shown in FIG. 16B, the status of information on a route is changed to deleted status in the route-information database 43#7 for transmission destinations C, D and E for which the temporarily halted router 80#1 serves as a transmission source. The information on a route for transmission destinations C, D and E is deleted from the route-information database 43#7.

The apparatus start/halt management unit 90#2 resumes the operations to report a change in information on a route involving the temporarily halted router 80#1 to the adjacent routers 80#3 and 80#4 other than the temporarily halted router 80#1 by way of the frame-transmitting unit 44#2 and the IF unit 4#2 as indicated by reference numeral (10) in FIG. 15. Since a change in information on a route involving the temporarily halted router 80#1 is reported to the adjacent routers 80#3 and 80#4 other than the temporarily halted router 80#1 in the event of an abnormality in the reactivation of the temporarily halted router 80#1 as described above, frames can be relayed without passing through the temporarily halted router 80#1.

The second embodiment described above exhibits the same effects as the first embodiment as follows. By clearly indicating a lock end time and monitoring a recovery, a change in information on a route involving a temporarily halted router can be disseminated to routers throughout the entire network in case the temporarily halted router cannot be recovered from a temporary halt within the lock end time by any chance. Furthermore, by clearly indicating a temporary halt and a recovery from the temporary halt, in the event of consecutive failures, a change in information on a route involving consecutive failures can be disseminated immediately to routers throughout the entire network without any delays in detections of the consecutive failures.

In the first and second embodiments described above, notifications of a start of a temporary halt and a recovery from a temporary halt are provided from an external source such as a person in charge of network management to a router to be temporarily halted. It should be noted, however, that such notifications can also be generated internally by the router itself. For example, a temporary halt such as software rebooting in a router is required after the router is recovered from a failure. In this case, a reactivation control unit for controlling a software-reboot operation or the like gives a notification of a start of a temporary halt to the apparatus start/halt management unit prior to a software-reboot operation. In turn, the apparatus start/halt management unit informs a temporary-halt-start-informing unit and other units of a temporary-halt start based on this notification. The reactivation control unit gives a notification of a recovery from a temporary halt to the apparatus start/halt management unit upon completion of a software-reboot operation. In turn, the apparatus start/halt management unit informs a temporary-halt-recovery notification unit and other units of a temporary-halt recovery based on this notification. In this way, the first and second embodiments can be changed to a configuration in which the reactivation control unit gives a notification of a start of a temporary halt and a notification of a recovery from a temporary halt to the apparatus start/halt management unit in place of an external command, allowing the present invention to be applied to a router capable of generating such notifications internally by itself. As is obvious from the above description, in accordance with the present invention, in a recovery of a router from a temporary halt accompanying maintenance work or a temporary failure, information on a route involving the router can be stabilized in a very short period of time.

It should be noted that the present invention is not limited to the details of the preferred embodiments described above. The scope of the present invention is defined by the following appended claims, and all changes and modifications falling within the scope of the claims are therefore to be embraced by the invention.

What is claimed is:

1. A router for routing a frame, comprising:
   a first memory;
   a route-information-receiving unit for receiving route information transmitted by an adjacent router;
   a route-information-writing unit for storing said information on a route into said first memory;
   a route-information-transmission control unit for controlling transmission of said information on a route to adjacent routers;
   a route-information-change-reporting unit for reporting a change in information on a route involving a particular adjacent router to adjacent routers other than said particular adjacent router if information on a route has not been received from said particular adjacent router for at least a predetermined period of time;
   a relay-processing unit for routing a received frame on the basis of said route information stored in said first memory;
   a temporary-halt-start-informing unit for transmitting a temporary-halt-start notification message indicating a start of a temporary halt to adjacent routers in the event of said temporary halt; and
   a temporary-halt-recovery-informing unit for transmitting a temporary-halt-recovery notification message indicating a recovery from a temporary halt to adjacent routers in the event of said recovery from said temporary halt, wherein
   said temporary halt temporarily halts a process relating to routing including a transmission of said information on a route; and said recovery restarts the process relating to routing including a transmission of said information on a route.

2. A router according to claim 1, further comprising:
   a second memory;
   a route-information-saving unit for saving route information stored in said first memory to said second memory in the event of a temporary halt; and
   a route-information-restoring unit for restoring information on a route from said second memory back to said first memory in the event of a recovery from a temporary halt.

3. A router according to claim 1, wherein, in the event of a temporary halt, said temporary-halt-start-informing unit informs other adjacent routers of a time to recovery from said temporary halt.

4. A router according to claim 1, further comprising:
   temporary-halt-start management unit for inputting a notification of a start of a temporary halt from an external source and passing on said notification to said temporary-halt-start-informing unit; and
   a temporary-halt-recovery management unit for inputting a notification of a recovery from a temporary halt from an external source and passing on said notification to said temporary-halt-recovery-informing unit.

5. A router for routing a frame, comprising:
   a first memory;
   a route-information-receiving unit for receiving information on a route transmitted by an adjacent router;
   a route-information-writing unit for storing said information on a route into said first memory;
   a route-information-transmission control unit for controlling transmission of said information on a route to adjacent routers;
   a route-information-change-reporting unit for reporting a change in information on a route involving a particular adjacent router to adjacent routers other than said particular adjacent router if information on a route has not been received from said particular adjacent router for at least a predetermined period of time;
   a relay-processing unit for routing a received frame on the basis of said route information scored in said first memory;

a temporary-halt-start-notification-receiving unit for receiving a temporary-halt-start notification message indicating a start of a temporary halt of an adjacent router from said adjacent router in the event of said temporary halt;

a route-information-temporarily-locking unit for requesting said route-information-change-reporting unit to temporarily lock a process to report a change in information on a route involving a particular adjacent router to adjacent routers other than said particular adjacent router when a temporary-halt-start notification message indicating a start of a temporary halt of a process relating to routing including a transmission of said information on a route of said particular adjacent router is received from said particular adjacent router;

a temporary-halt-recovery-notification-receiving unit for receiving a temporary-halt-recovery notification message indicating a recovery from a temporary halt of an adjacent router from said adjacent router in the event of said recovery from said temporary halt; and a route-information-temporary-lock-ending unit for requesting said route-information-change-reporting unit to end a state to temporarily lock the process to report a change in information on a route involving a particular adjacent muter to adjacent routers other than said particular adjacent router when a temporary-halt-recovery notification message indicating a recovery from a temporary halt of said particular adjacent router is received from said particular adjacent router.

6. A router according to claim 5, further comprising a temporary-halt-recovery-notification-monitoring unit for requesting said route-information-change-reporting unit to end said state to temporarily lock an operation to report a change in information an a route in case a temporary-halt-recovery notification message is not received even after another predetermined period of time has lapsed since reception of a temporary-halt-start notification message specifying said other predetermined period of time.

7. A router according to claim 5, wherein:
said first memory is used for storing status for each piece of route information stored in said first memory;
said route-information-temporarily-locking unit changes stains of information on a route involving a router transmitting said temporary-halt-start notification message from normal status to locked status in said first memory;
said route-information-temporary-lock-ending unit restores status of information on a route involving a router transmitting said temporary-halt-recovery notification message from locked status to normal status in said first memory; and
said route-information-change-reporting unit locks an operation to report a change in information on a route for a router with route information set in locked status but reports a change in information on a route for a router with route information set in normal status.

8. A router according to claim 1, further comprising:
a temporary-halt-start-notification-receiving unit for receiving a temporary-halt-start notification message indicating a start of a temporary halt from an adjacent muter in the event of said temporary halt;
a route-information-temporary-locking unit for requesting said route-information-change-reporting unit to lock an operation to report a change in information on a route involving a particular adjacent router to adjacent routers other than said particular adjacent router when a temporary-halt-start notification message indicating a start of a temporary halt is received from said particular adjacent router;

a temporary-halt-recovery-notification-receiving unit for receiving a temporary-halt-recovery notification message indicating a recovery from a temporary halt from an adjacent router in the event of said recovery from said temporary halt; and a route-information-temporary-lock-ending unit for requesting said route-information-change-reporting unit to end a state to temporarily lock an operation to report a change in information on a mute involving a particular adjacent router to adjacent routers other than said particular adjacent router when a temporary-halt-recovery notification message indicating a recovery from a temporary halt is received from said particular adjacent router.

9. A router according to claim 1, further comprising:
means for transmitting a second message indicating a recovery from a temporary halt to adjacent routers when said router is recovered from said temporary halt; and
means for executing control to report a change in information on a route involving a particular adjacent router to adjacent routers other than said particular adjacent router when said second message is received from said particular adjacent router even if information on a route has not been received from said particular adjacent router for at least a predetermined period of time.

10. A router comprising:
means for reporting a change in information on a route involving a particular adjacent router to adjacent routers other than said particular adjacent router when information on a route has not been received from said particular adjacent router for at least a predetermined period of time;
means for transmitting a message to adjacent routers to inform said adjacent routers that a process relating to routing of said router is temporarily halted when said process relating to routing including a transmission of said information on a route of said router and routing processing of a received packet are temporarily halted; and
means for temporarily halting a process to report a change in information on a route involving a particular adjacent router to adjacent routers other than said particular adjacent router when said message is received from said particular adjacent router even if information on a route has not been received from said particular adjacent route for at least a predetermined period of time.

11. A temporary halting method adopted in a network including a plurality of routers each used for routing a frame, said temporary halting method comprising the steps of:
having a temporarily halted one of said routers transmit a temporary-halt-start notification message indicating a start of a temporary halt of said temporarily halted router to any one of said routers, which is adjacent to said temporarily halted router, in the event of said temporary halt;
having said temporarily halted router transmit a temporary-halt-recovery notification message indicating a recovery from a temporary halt of said temporarily halted router to any one of said routers, which is adjacent to said temporarily halted router, in the event of said recovery from said temporary halt;
having any one of said routers, which is adjacent to a temporarily halted one of said routers, lock a state of reporting no change in information on a route involving said temporarily halted router to any adjacent one of said routers, which is other than said temporarily halted router, when receiving a temporary-halt-start notification message indicating a start of a temporary halt from said temporarily halted router even if receiving no information on a route from said temporarily halted router for a predetermined period of time; and having any one of said routers, which is adjacent to a temporarily halted one of said routers, resume a monitoring operation of reporting a change in information on a route involving said temporarily halted router to any adjacent one of said routers, which is other than said temporarily halted router, when receiving a temporary-halt-recovery notification message indicating a recovery from a temporary halt from said temporarily halted router or when receiving no information on a route from said temporarily halted router for a predetermined period of time.

* * * * *